(12) United States Patent
Kochar et al.

(10) Patent No.: US 12,007,734 B2
(45) Date of Patent: Jun. 11, 2024

(54) DATACENTER LEVEL POWER MANAGEMENT WITH REACTIVE POWER CAPPING

(71) Applicant: Oracle International Corporation, Redwood Shores, CA (US)

(72) Inventors: Sumeet Kochar, Cary, NC (US); Roy Mehdi Zeighami, Fall City, WA (US); Jacob Adam Gabrielson, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/202,712

(22) Filed: May 26, 2023

(65) Prior Publication Data

US 2024/0103469 A1     Mar. 28, 2024

Related U.S. Application Data

(60) Provisional application No. 63/409,469, filed on Sep. 23, 2022.

(51) Int. Cl.
*G05B 19/042*     (2006.01)

(52) U.S. Cl.
CPC .... *G05B 19/042* (2013.01); *G05B 2219/2639* (2013.01)

(58) Field of Classification Search
CPC ............. G05B 19/042; G05B 2219/2639
See application file for complete search history.

(56) References Cited

U.S. PATENT DOCUMENTS

| 5,546,568 A | 8/1996 | Bland et al. |
| 8,006,108 B2 | 8/2011 | Brey et al. |
| (Continued) | | |

FOREIGN PATENT DOCUMENTS

| IN | 202221026483 | 3/2022 |
| WO | 2019213466 A1 | 11/2019 |
| WO | 2021214752 A1 | 10/2021 |

OTHER PUBLICATIONS

Bhattacharya et al., "The Need for Speed and Stability in Data Center Power Capping", International Green Computing Conference (IGCC), Available Online at: http://sdb.cs.berkeley.edu/sdb/files/publications/local/the_need_for_speed.pdf, Jun. 4-8, 2012, 10 pages.

(Continued)

*Primary Examiner* — Yuhui R Pan
(74) *Attorney, Agent, or Firm* — Kilpatrick Townsend & Stockton LLP

(57) ABSTRACT

Disclosed techniques relate to managing power within a power distribution system. Power consumption corresponding to devices (e.g., servers) that receive power from an upstream device (e.g., a bus bar) may be monitored (e.g., by a service) to determine when power consumption corresponding to those devices breaches (or approaches) a budget threshold corresponding to an amount of power allocated to the upstream device. If the budget threshold is breached, or is likely to be breached, the service may initiate operations to distribute power caps for the devices and to initiate a timer. Although distributed, the power caps may be ignored by the devices until they are instructed to enforce the power caps (e.g., upon expiration of the timer). This allows the power consumption of the devices to exceed the budgeted power associated with the upstream device at least until expiration of the timer while avoiding power outage events.

20 Claims, 13 Drawing Sheets

(56) References Cited

U.S. PATENT DOCUMENTS

| | | | |
|---|---|---|---|
| 8,514,215 | B2 | 8/2013 | Cases et al. |
| 8,694,810 | B2 | 4/2014 | Ahluwalia et al. |
| 8,732,503 | B2 | 5/2014 | Okano |
| 8,843,772 | B2 | 9/2014 | Hormuth |
| 8,914,157 | B2 | 12/2014 | Li et al. |
| 8,930,725 | B2 | 1/2015 | Wang |
| 9,146,814 | B1 | 9/2015 | van der Merwe et al. |
| 9,262,272 | B2 | 2/2016 | Akers et al. |
| 9,538,689 | B2 | 1/2017 | Dasario et al. |
| 9,880,599 | B1* | 1/2018 | Allen-Ware ......... G06F 1/3203 |
| 10,075,327 | B2 | 9/2018 | Maltz et al. |
| 10,460,403 | B2 | 10/2019 | Janssen et al. |
| 10,608,433 | B1 | 3/2020 | McNamara et al. |
| 10,643,121 | B2 | 5/2020 | Evans et al. |
| 11,099,628 | B2 | 8/2021 | Ananthakrishnan et al. |
| 11,106,528 | B2 | 8/2021 | Wolfson et al. |
| 11,157,380 | B2 | 10/2021 | Sethi et al. |
| 11,275,429 | B2 | 3/2022 | Singh et al. |
| 11,287,868 | B1* | 3/2022 | Sturm ...................... G06F 1/30 |
| 11,349,337 | B2 | 5/2022 | Gyota |
| 11,397,457 | B2 | 7/2022 | Jain et al. |
| 11,397,634 | B1 | 7/2022 | Monga et al. |
| 11,398,729 | B1 | 7/2022 | Upreti et al. |
| 11,514,354 | B2 | 11/2022 | Rajnayak et al. |
| 11,544,676 | B2 | 1/2023 | Ghosh et al. |
| 11,561,851 | B2 | 1/2023 | Wolfson et al. |
| 11,656,928 | B2 | 5/2023 | Monga et al. |
| 2003/0037150 | A1 | 2/2003 | Nakagawa |
| 2003/0056125 | A1 | 3/2003 | O'Conner et al. |
| 2003/0171851 | A1 | 9/2003 | Brickfield et al. |
| 2004/0264124 | A1 | 12/2004 | Patel |
| 2005/0102544 | A1 | 5/2005 | Brewer et al. |
| 2005/0138438 | A1 | 6/2005 | Bodas |
| 2006/0028347 | A1 | 2/2006 | Ziejewski et al. |
| 2008/0320322 | A1 | 12/2008 | Green |
| 2009/0070611 | A1 | 3/2009 | Bower, III et al. |
| 2009/0210376 | A1 | 8/2009 | Lorge |
| 2009/0240964 | A1 | 9/2009 | Pfeiffer |
| 2011/0047390 | A1 | 2/2011 | Bolan et al. |
| 2011/0090077 | A1 | 4/2011 | Meyer et al. |
| 2011/0173465 | A1 | 7/2011 | Akers et al. |
| 2011/0301911 | A1 | 12/2011 | VanGilder |
| 2012/0109394 | A1 | 5/2012 | Takagi et al. |
| 2012/0283888 | A1 | 11/2012 | Mao et al. |
| 2012/0323382 | A1 | 12/2012 | Kamel et al. |
| 2014/0001847 | A1 | 1/2014 | Khandelwal |
| 2014/0006819 | A1 | 1/2014 | Min et al. |
| 2014/0137107 | A1* | 5/2014 | Banerjee ............... G06F 1/3206 718/1 |
| 2015/0234879 | A1 | 8/2015 | Baldwin et al. |
| 2016/0054779 | A1 | 2/2016 | Bodas |
| 2016/0102880 | A1 | 4/2016 | Lovicott |
| 2016/0291656 | A1 | 10/2016 | Jenne |
| 2016/0294211 | A1 | 10/2016 | Tricarico |
| 2017/0017288 | A1 | 1/2017 | Bose et al. |
| 2017/0351232 | A1 | 12/2017 | Chen et al. |
| 2019/0004579 | A1 | 1/2019 | Allen-Ware et al. |
| 2019/0332164 | A1 | 10/2019 | Sinha et al. |
| 2020/0073456 | A1 | 3/2020 | Nguyen et al. |
| 2020/0136396 | A1 | 4/2020 | Sun |
| 2020/0272889 | A1 | 8/2020 | Evans et al. |
| 2020/0331636 | A1 | 10/2020 | Mulholland et al. |
| 2020/0380295 | A1 | 12/2020 | Natsumeda et al. |
| 2021/0042140 | A1 | 2/2021 | Paul et al. |
| 2021/0081020 | A1 | 3/2021 | Ghose |
| 2021/0081266 | A1 | 3/2021 | Kern et al. |
| 2021/0190362 | A1 | 6/2021 | Ko et al. |
| 2021/0262689 | A1 | 8/2021 | Shinde et al. |
| 2021/0302043 | A1 | 9/2021 | Dempsey |
| 2021/0303388 | A1 | 9/2021 | George et al. |
| 2021/0349776 | A1 | 11/2021 | Wolfson et al. |
| 2021/0397239 | A1 | 12/2021 | Sethi et al. |
| 2021/0405727 | A1 | 12/2021 | Singh et al. |
| 2022/0090804 | A9 | 3/2022 | Magcale |
| 2022/0164186 | A1 | 5/2022 | Pamidala et al. |
| 2022/0334558 | A1 | 10/2022 | Huang et al. |
| 2022/0410171 | A1 | 12/2022 | Ghose |
| 2023/0037609 | A1 | 2/2023 | Gururaja et al. |
| 2023/0061136 | A1 | 3/2023 | Abdollahian Noghabi et al. |
| 2023/0069177 | A1 | 3/2023 | Albright et al. |
| 2023/0108991 | A1 | 4/2023 | Sato et al. |
| 2023/0117225 | A1 | 4/2023 | Porto Guedes et al. |
| 2023/0148090 | A1 | 5/2023 | Mazur et al. |
| 2023/0153680 | A1 | 5/2023 | Rohrkemper et al. |
| 2023/0208139 | A1 | 6/2023 | Holveck et al. |
| 2023/0229216 | A1 | 7/2023 | Lerer et al. |
| 2023/0236923 | A1 | 7/2023 | Gowri et al. |
| 2023/0239809 | A1 | 7/2023 | Mukherjee et al. |
| 2023/0259102 | A1 | 8/2023 | Misra et al. |
| 2023/0259112 | A1 | 8/2023 | Cheon et al. |
| 2023/0367378 | A1 | 11/2023 | Vaysman et al. |

OTHER PUBLICATIONS

Chen et al., "Dynamic Server Power Capping for Enabling Data Center Participation in Power Markets", IEEE/ACM International Conference on Computer-Aided Design (ICCAD), Available Online at: https://www.bu.edu/peaclab/files/2014/03/chen_ICCAD13.pdf, Nov. 18-21, 2013, 8 pages.

Li et al., "A Scalable Priority-Aware Approach to Managing Data Center Server Power", IEEE International Symposium on High-Performance Computer Architecture (HPCA), Available Online at: https://www.pdl.cmu.edu/PDL-FTP/PowerMgmt/CapMaestro_HPCA2019.pdf, Feb. 2019, pp. 1-14.

Wu et al., "Dynamo: Facebook's Data Center-Wide Power Management System", ACM/IEEE 43rd Annual International Symposium on Computer Architecture, Available Online at: http://ieeexplore.ieee.org/document/7551415/, Jun. 18-22, 2016, pp. 469-480.

Law Firm of Naren Thappeta, "Patentability Search Report," Datacenter Level Power Management with Reactive Power Capping, Feb. 2, 2023, 18 pages.

Li et al., CapMaestro: Exploiting Power Redundancy, Data Center—Wide Priorities, and Stranded Power for Boosting Data Center Performance, IBM Research Report RC25680, Mar. 28, 2018, 19 pages.

Sakalkar et al., Data Center Power Oversubscription with a Medium Voltage Power Plane and Priority-Aware Capping, Proceedings of the Twenty-Fifth International Conference on Architectural Support for Programming Languages and Operating Systems, Mar. 16-20, 2020, pp. 497-511.

Active Power Management™ For Green Data Centers A Breakthrough Approach for Energy-efficient Operation of Your Servers, Cassatt Corporation, Available Online at: https://ftpdocs.broadcom.com/cadocs/IM_Documents/ecoMeter/Cassatt/GDCWhitePaper09_03%20FINAL.pdf, Sep. 16, 2007, pp. 1-8.

Cassatt Announces Strategy to Save Energy by Turning off Idle Servers in the Data Center, Datacenter Dynamics, Available Online at: https://www.datacenterdynamics.com/en/news/cassatt-announces-strategy-to-save-energy-by-turning-off-idle-servers-in-the-data-center-2/, Sep. 4, 2007, pp. 1-8.

Intelligent Load Shedding |Optimal Load Preservation |Intelligent Load Restoration, Operation Technology, Inc., Available Online at: https://etap.com/solutions/load-shedding-system, Accessed from Internet on Jan. 4, 2023, pp. 1-11.

Patentability Search Report dated Jan. 5, 2023, 19 pages.

Taking Automatic Corrective Action in Your Data Center, AVTECH Software Inc., Available Online at: https://avtech.com/articles/9054/taking-automatic-corrective-action-data-center, Accessed from Internet on Jan. 4, 2023, pp. 1-4.

U.S. Appl. No. 18/338,695, Non-Final Office Action dated Nov. 29, 2023, 21 pages.

U.S. Appl. No. 18/338,962, Non-Final Office Action dated Dec. 6, 2023, 48 pages.

U.S. Appl. No. 18/339,114, Non-Final Office Action dated Aug. 31, 2023, 22 pages.

Shokooh et al., Intelligent Load Shedding Need for a Fast and Optimal Solution, Institute of Electrical and Electronics Engineers PCIC, Jan. 2005, pp. 1-10.

(56) References Cited

OTHER PUBLICATIONS

International Application No. PCT/US2023/068334, International Search Report and Written Opinion, dated Oct. 11, 2023, 16 pages.
Fu et al., How Much Power Oversubscription is Safe and Allowed in Data Centers, Proceedings of the 8th ACM International Conference on Autonomic Computing, ICAC'11, Jan. 1, 2011.
U.S. Appl. No. 18/338,962, Notice of Allowance, Mailed On Mar. 26, 2024, 24 pages.
U.S. Appl. No. 18/338,695, Final Office Action, mailed on Apr. 18, 2024, 28 pages.
U.S. Appl. No. 18/339,114, Final Office Action, mailed on Apr. 18, 2024, 32 pages.

* cited by examiner

DATACENTER LEVEL POWER MANAGEMENT WITH REACTIVE POWER CAPPING

CROSS REFERENCES TO RELATED APPLICATIONS

The present application claims priority to U.S. Provisional Application No. 63/409,469, filed Sep. 23, 2022, entitled "DATACENTER LEVEL POWER MANAGEMENT WITH REACTIVE POWER CAPPING," the content of which is herein incorporated by reference in its entirety for all purposes.

BACKGROUND

Datacenters are configured with a power infrastructure that affords numerous safety features according to a hierarchical power distribution. Power is provided from a local power utility and allocated to various components of the datacenter including power distribution units (PDUs) (e.g., transformers, switch boards, bus ways, rack PDUs, etc.) and power consuming devices (e.g., servers, network devices, etc.) according to this power distribution hierarchy. This ensures that power consumed by all downstream devices adheres to the power limits of each device upstream. When demand peaks and the power consumption of downstream devices exceeds the power limit of an upstream device, a circuit breaker associated with the higher-level device may trip, causing significant disruption to at least the downstream devices, resulting in reduced processing capabilities within the datacenter and a poor user experience. In worst-case scenarios, a tripped breaker can trigger a cascading power failure of other devices within the same or additional datacenters as workloads are redistributed in an attempt to recover from the initial power outage.

Due to the disruptive and costly nature and potentially long-reaching effects of exceeding these power limits, previous systems over-provisioned datacenter components such that each power distribution device was allocated power that exceeded the expected maximum power consumption of all downstream devices. The downstream devices were assigned power caps to constrain and throttle operations at each device to ensure the downstream devices adhered to this expected maximum power consumption. These power caps were applied to avoid or correct even momentary excursions above the assigned power limits. This ensured that even in worst-case scenarios in which all downstream devices' power consumption peaked simultaneously, that maximum power draw expected at the upstream device would not be exceeded. These techniques were aimed at reducing the risk of tripping breakers and losing computing resources. However, these approaches lead to wasteful utilization of power, allowing power allocated to upstream devices to remain underutilized. Additionally, power capping restricts operations performed at the downstream device and may be visible to customers, which it turn can lead to a frustrating user experience. As a result, it is desirable to utilize power management techniques that minimize the frequency at which operations at the downstream devices are constrained, while maintaining a high degree of safety with respect to avoiding power failures.

BRIEF SUMMARY

In the following description, for the purposes of explanation, specific details are set forth in order to provide a thorough understanding of certain embodiments. However, it will be apparent that various embodiments may be practiced without these specific details. The figures and description are not intended to be restrictive.

Some embodiments may include a method. The method may comprise identifying, by a power management service, a plurality of components of a power system that are arranged according to a power distribution hierarchy that comprises a plurality of nodes organized according to respective levels of a plurality of levels. In some embodiments, a node of the plurality of nodes of the power distribution hierarchy represents a corresponding component of the plurality of components. A subset of nodes of a first level of the plurality of levels may descend from a particular node of a second level of the plurality of levels that is higher than the first level. A set of lower-level components of the plurality of components that are represented by the subset of nodes of the first level may receive power distributed through a higher-level component of the plurality of components that is represented by the particular node of the second level. The method may comprise monitoring, by the power management service, power consumption of the set of lower-level components represented by the subset of nodes of the first level. The method may comprise determining, by the power management service based at least in part on the monitoring, that the power consumption of the set of lower-level components has breached a budget threshold associated with the higher-level component. The method may comprise, responsive to determining that the power consumption of the set of lower-level components has breached the budget threshold associated with the higher-level component, transmitting a power cap value for a lower-level component. In some embodiments, transmission of the power cap value causes the lower-level component to store the power cap value in memory while allowing a respective power consumption of the lower-level component to exceed the power cap value, until a time period corresponding to a timing value expires.

Some embodiments may include a second method. The second method may comprise identifying, by a power management service, a plurality of components of a power system that are arranged according to a power distribution hierarchy that comprises a plurality of nodes organized according to respective levels of a plurality of levels. In some embodiments, a node of the plurality of nodes of the power distribution hierarchy represents a corresponding component of the plurality of components. A subset of nodes of a first level of the plurality of levels may descend from a particular node of a second level of the plurality of levels that is higher than the first level. A set of lower-level components of the plurality of components that are represented by the subset of nodes of the first level may receive power distributed through a higher-level component of the plurality of components that is represented by the particular node of the second level. The second method may comprise monitoring, by the power management service, power consumption of the set of lower-level components represented by the subset of nodes of the first level. The second method may comprise determining, by the power management service based at least in part on the monitoring, that the power consumption of the set of lower-level components has breached a budget threshold associated with the higher-level component. The second method may comprise, responsive to determining that the power consumption of the set of lower-level components has breached the budget threshold associated with the higher-level component, initiating a timer corresponding to a timing value. In some embodiments, expiration of the timer indicates expiration of a time period corresponding to the timing value. In some embodiments, a lower-level component of the set of lower-level components stores a power cap value in memory during the time period. In some embodiments, enforcement of the power cap value on the lower-level component is delayed until the expiration of the timer.

Systems, devices, and computer media are disclosed, each of which may comprise one or more memories on which instructions corresponding to the methods disclosed herein may be stored. The instructions may be executed by one or more processors of the disclosed systems and devices to execute the methods disclosed herein. One or more computer programs can be configured to perform particular operations or actions corresponding to the described methods by virtue of including instructions that, when executed by data processing apparatus, cause the apparatus to perform the actions.

DETAILED DESCRIPTION

Figure 1:
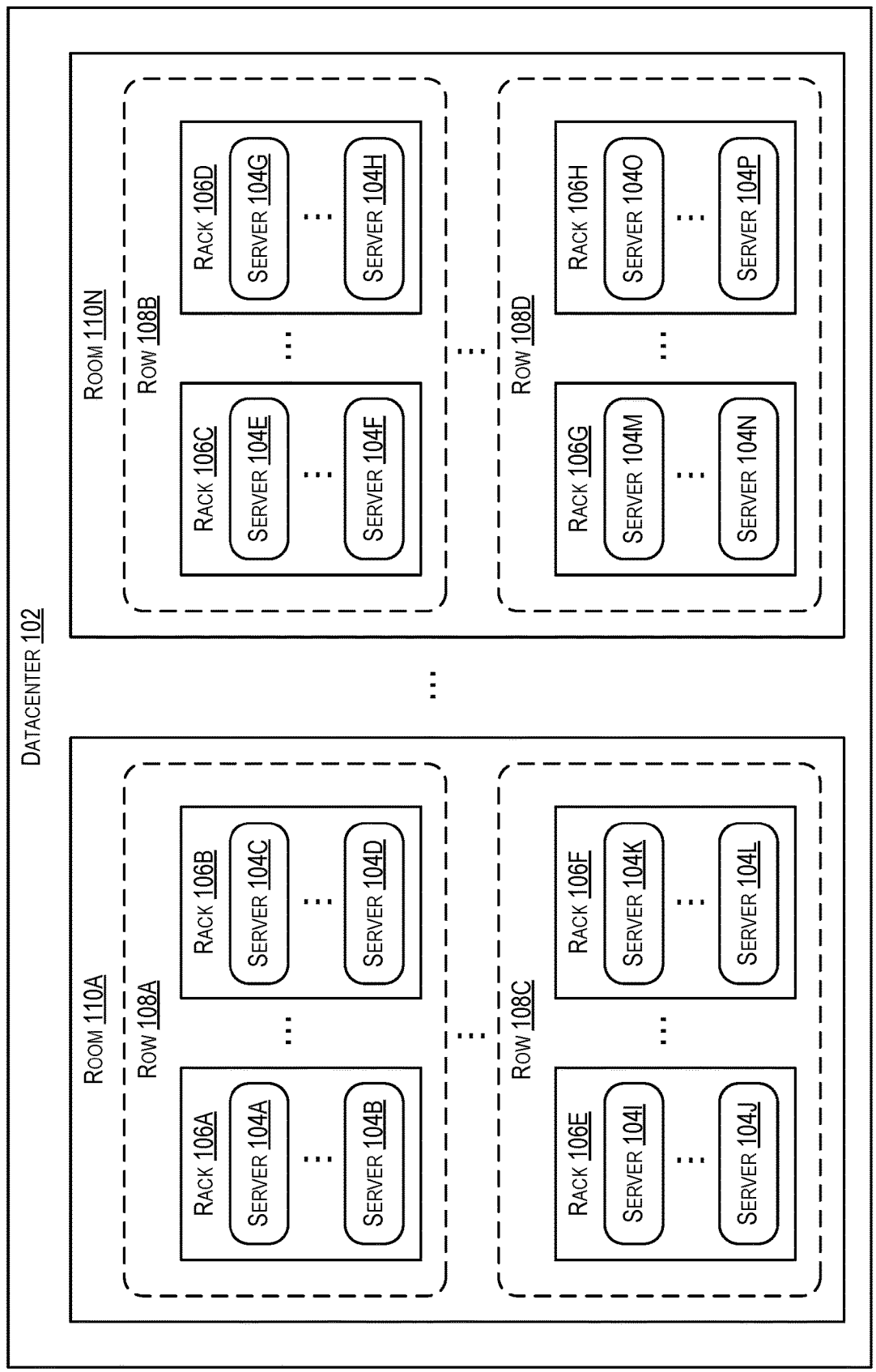
FIG. 1 depicts an example environment that houses a variety of components, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The present disclosure relates to managing a power distribution system, such as a power distribution infrastructure within a datacenter. More particularly, techniques are described for enabling components within the datacenter to safely consume power at a rate that is closer to the datacenter's maximum capacity/supply. Conventionally, at least some power capacity of a datacenter is left unutilized due to overprovisioning/over allocating power to various power distribution units (e.g., transformers, switch boards, bus ways, rack PDUs, etc.) within the power distribution infrastructure. A "power distribution unit" (also referred to as a "power distribution component") refers to any suitable device, component, or structure that is configured to distribute power to other devices or areas. "Overprovisioning power," also referred to as "over allocating," refers to the power distribution approach in which power is provisioned/allocated to power distribution units according to a worst-case power consumption scenario in which every power consuming device in the datacenter is expected to run at peak capacity. In this approach, each power distribution unit is allocated enough power to handle peak consumption of every device downstream, plus some buffer. The power allocated to a power distribution unit may be referred to as its "budgeted power" or "allocated power."

Balancing power supply and consumption within a datacenter is desirable. When the power consumed outstrips the available supply, the balance can be restored by increasing the power supply or reducing the rate of consumption. If this balance is not maintained and the components attempt to consume more than the available supply, circuit breakers may trip, disconnecting components from the supply. Disconnected components can cause interruptions in the operations performed by the components of the datacenter. By way of example, a website hosted on datacenter servers will crash if a tripped circuit breaker disconnects the servers from the datacenter's power supply. As a result, various techniques have been employed to avoid tripping circuit breakers.

The balance between a datacenter's power supply and power consumption can be managed by maintaining an equilibrium between the available supply and the demand and/or consumption. Scaling the power supply in a datacenter may not be feasible at times because power is often statically allocated in long term contracts with an electric utility. While the supply may be statically allocated, power consumption in a datacenter can vary, sometimes drastically. As a simplistic example, a server's power consumption may increase when the number of threads executed by the server's processer increases. Ambient temperature within the datacenter can affect the power consumed by the datacenter's cooling systems. When the cooling system works harder, it consumes more power as it works to reduce the ambient temperature experienced in the datacenter. The demand caused by some components in the datacenter, such as uninterruptible power supplies, power distribution units, cooling systems, or bus ways, may be difficult to adjust. However, some components, such as servers or networking components, can be more easily constrained.

Many conventional power management approaches utilize power capping to constrain operations at power-consuming devices (e.g., servers, network devices, etc.) within a datacenter. When power capping is utilized, a power cap limit may be used to constrain the power consumed by a device. The power cap limit is used to constrain (e.g., throttle) operations at the server to ensure that the server's power consumption does not exceed the power cap limit. Using power capping ensures that upstream devices' allocated power limits are not breached, causing the overprovisioned power at each upstream device to remain unutilized. These approaches waste valuable power and limit the density of power-consuming devices that can be utilized within the datacenter.

An efficient power infrastructure within a datacenter is necessary to increase the provider's profit margins, to manage scarce power resources, and to make services provided by the datacenter more environmentally friendly. A datacenter that includes components that host a multi-tenant environment (e.g., a public cloud) may experience higher than the average consumption because not all the tenancies of the cloud are used simultaneously. To push power consumption closer to the statically allocated capacity to improve the efficiency and resource utilization of the datacenter, datacenter providers may increase servers and/or tenancies so that the power consumption across all power-consuming devices is closer to the allocated power capacity of the datacenter. However, in some instances, closing the gap between the allocated power capacity and the power consumption increases the risk of tripping circuit breakers and losing the ability to utilize computing resources. Techniques described herein minimize the frequency at which operations at the downstream devices are constrained, enable these devices to utilize previously unutilized power, all while maintaining a high degree of safety with respect to avoiding power failures.

FIG. 1 depicts an example environment (e.g., environment 100) including a variety of components, in accordance with at least one embodiment. Environment 100 may include datacenter 102 that may include a dedicated space that hosts any suitable number of servers, such as servers 104A-P (collectively referred to as "servers 104"), and the infrastructure for hosting those servers such as networking hardware, cooling systems, and storage devices. Networking hardware (not depicted here) of the datacenter 100 can enable remote users to interact with the servers over a network (e.g., the Internet). Any suitable number of servers 104 (e.g., 10, 14, 21, 42, etc.) can be held in various racks such as racks 106A-H (collectively referred to as "racks 106"). Racks 106 can include a frame or enclosure to which corresponding sets of servers are placed and/or mounted.

Various subsets of racks 106 can be organized into groups called "rows" (e.g., rows 108A-D, collectively referred to as "rows 108"). In some implementations, the rows 108 can include any suitable number of racks (e.g., 5, 8, 10, up to 10, etc.) that are collocated (e.g., within a threshold distance from one another). In other implementations, rows can be an organizational unit and the racks with a given row can be placed in different locations (not necessarily within a threshold distance of one another). As an example, rows 108 can be located in a room (e.g., room 110A, room 110N, etc.). A room (e.g., room 110A) can be a subdivision of a building or a physical enclosure in which any suitable number of racks 106 are placed. In other embodiments, a room can be an organizational unit and the rooms can be located in different physical locations or multiple rooms can be located in a single subdivision of a building.

Figure 2:
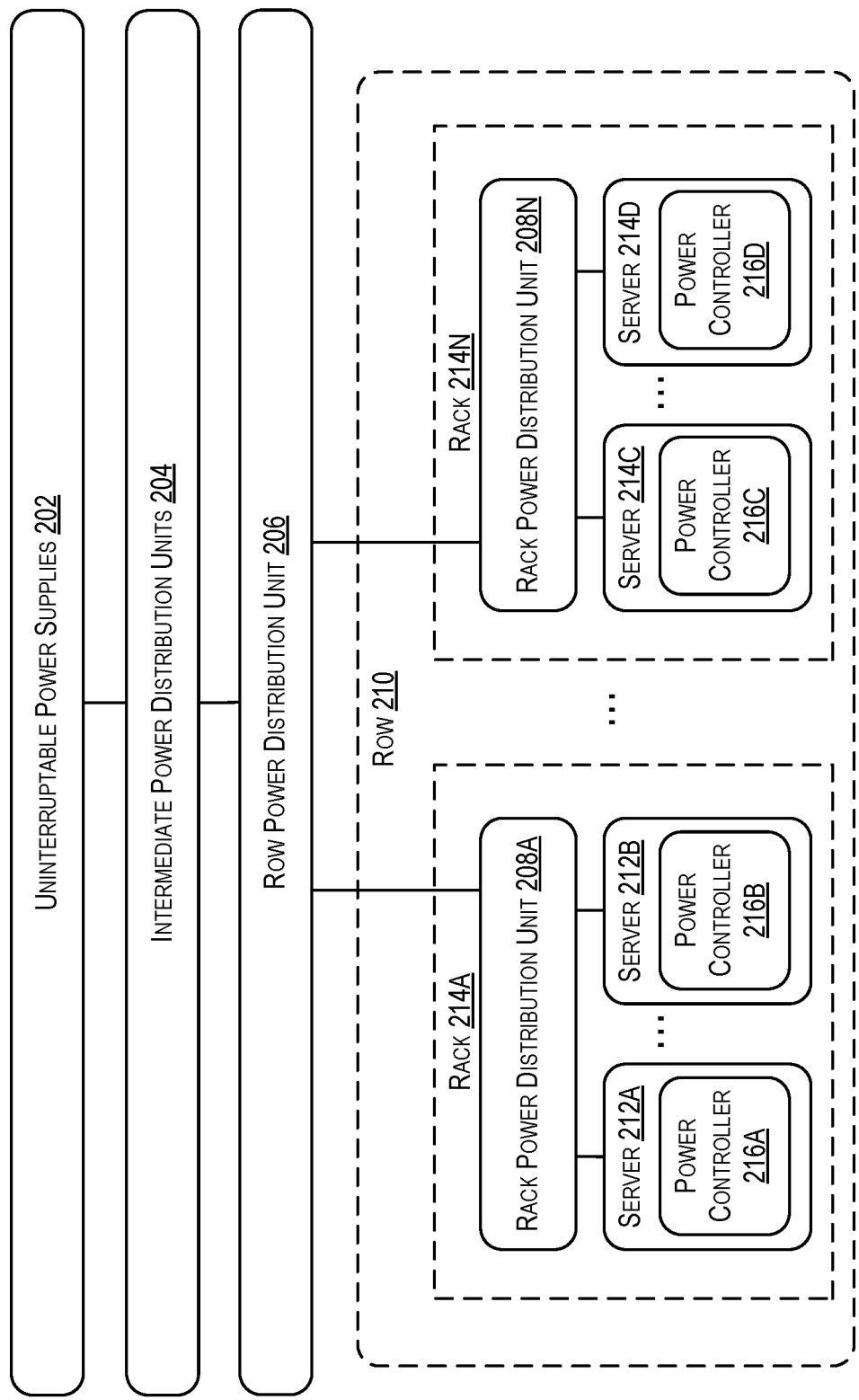
FIG. 2 shows a simplified diagram an exemplary power distribution infrastructure including a variety of components of a datacenter, in accordance with at least one embodiment.

FIG. 2 shows a simplified diagram an exemplary power distribution infrastructure 200 including a variety of components (e.g., components of datacenter 102 of FIG. 1), in accordance with at least one embodiment. The power distribution infrastructure 200 can be connected to a utility power source (not depicted) and power can initially be received at one or more uninterruptable power supplies (uninterruptable power supplies (UPS(s)) 202). In some embodiments, the power may be received from the utility, at the UPS(s) via an on-site power sub-station (not depicted) that is configured to establish suitable voltage levels for distributing electricity through the datacenter). UPS(s) 202 may individually include a specialized battery or generator that provides emergency power if the input power source fails. UPS(s) 202 may monitor the input power and provide backup power if a drop in the input power is detected.

The power distribution infrastructure 200 can include any suitable number of intermediate power distribution units (PDU(s)) (e.g., intermediate PDU(s) 204) that connect to and receive power/electricity from UPS(s) 202. Any suitable number of intermediate PDU(s) 204 may be disposed between a UPS (of UPS(s) 202) and any suitable number of row PDUs (e.g., row PDU 206). A power distribution unit (e.g., intermediate PDU(s) 204, row PDU 206, rack PDU(s) 208, etc.) may be any suitable device that is configured to control and distribute power/electricity. Example power distribution units may include, but are not limited to main switchboards, switchboards, remote power panels, bus bars, power strips, transformers, and the like. Power can be provided to intermediate PDU(s) 204 from the UPS(s) 202. Intermediate PDU(s) 204 may distribute power to downstream components (e.g., row PDU 206) of power distribution infrastructure 200.

The power distribution infrastructure 200 may include any suitable number of row power distribution units (including row PDU 206). A row PDU may include any suitable PDU (e.g., a remote power panel, a bus bar/way, etc.) that is disposed between an intermediate PDU (e.g., a PDU of intermediate PDU(s) 204) and one or more rack PDUs (e.g., rack PDU 208A, rack PDU 208N, collectively referred to as "rack PDU(s) 208"). A "row PDU" refers to a PDU that is configured to distribute power to one or more rows of devices (e.g., row 210, including servers 212A-D, collectively referred to as "servers 212"). As described above, a row (e.g., row 210) can include any suitable number of racks (e.g., racks 214A-N, collectively referred to as "racks 214") within which the servers 212 are located.

The power distribution infrastructure 200 can include any suitable number of rack power distribution units (including rack PDU(s) 208). A rack PDU may include any suitable PDU that is disposed between a row PDU (e.g., row PDU 206) and one or more servers (e.g., server 212A, server 212B, etc.) corresponding to a rack (e.g., rack 214A, an example of the racks 106 of FIG. 1). A "rack PDU" refers to any suitable PDU that is configured to distribute power to one or more servers within a rack. The rack (e.g., rack 214A) can include any suitable number of servers 212. In some embodiments, rack PDU(s) 208 may include intelligent PDUs that are additionally configured to monitor, manage, and control consumption at multiple devices (e.g., rack PDU 208A, server 212A, server 212B, etc.).

Servers 212 (each an example of servers 104 of FIG. 1) can individually include a power controller (power controller(s) 216A-D, collectively referred to as "power controllers 216")). A power controller refers to any suitable hardware or software component operating at a device (e.g., a server) that is configured to monitor and/or manage power consumption at the device. Power controllers 216 may individually monitor the power consumption of a respective server on which they operate. Power controllers 216 may each be configured enforce power cap limits to constrain power consumption at a respective server. Enforcing power cap limits may include any suitable combination of: monitoring power consumption at the server, determining whether to constrain (e.g., limit, restrict, etc.) power consumption at the server (e.g., based at least in part on a comparison between the server's current consumption and a stored power cap limit), and limiting/restricting power consumption at the server (e.g., using processor and memory dynamic voltage and frequency scaling to suppress server power consumption). Enforcing power cap limits may be referred to as "power capping."

Datacenter 102 of FIG. 1 may include various components depicted in power distribution infrastructure 200. By way of example, the room 110A may include one or more bus ways (each an example of row PDU 206). A bus bar (also referred to as a "bus way") refers to a duct of conductive material that can distribute power (e.g., within the room 110A). A bus way can receive power from a power distribution unit of intermediate PDU(s) 204 and provide power to one or more racks (e.g., rack 106A of FIG. 1, rack 106B of FIG. 1, etc.) associated with a row (e.g., row 108A of FIG. 1). Each power infrastructure component that distributes/provides power to other components, also consumes a portion of the power that passes through it. This loss can be caused by heat loss from power flowing through the component or by power directly consumed by the component (e.g., power consumed by a processor in a rack PDU).

Figure 3:
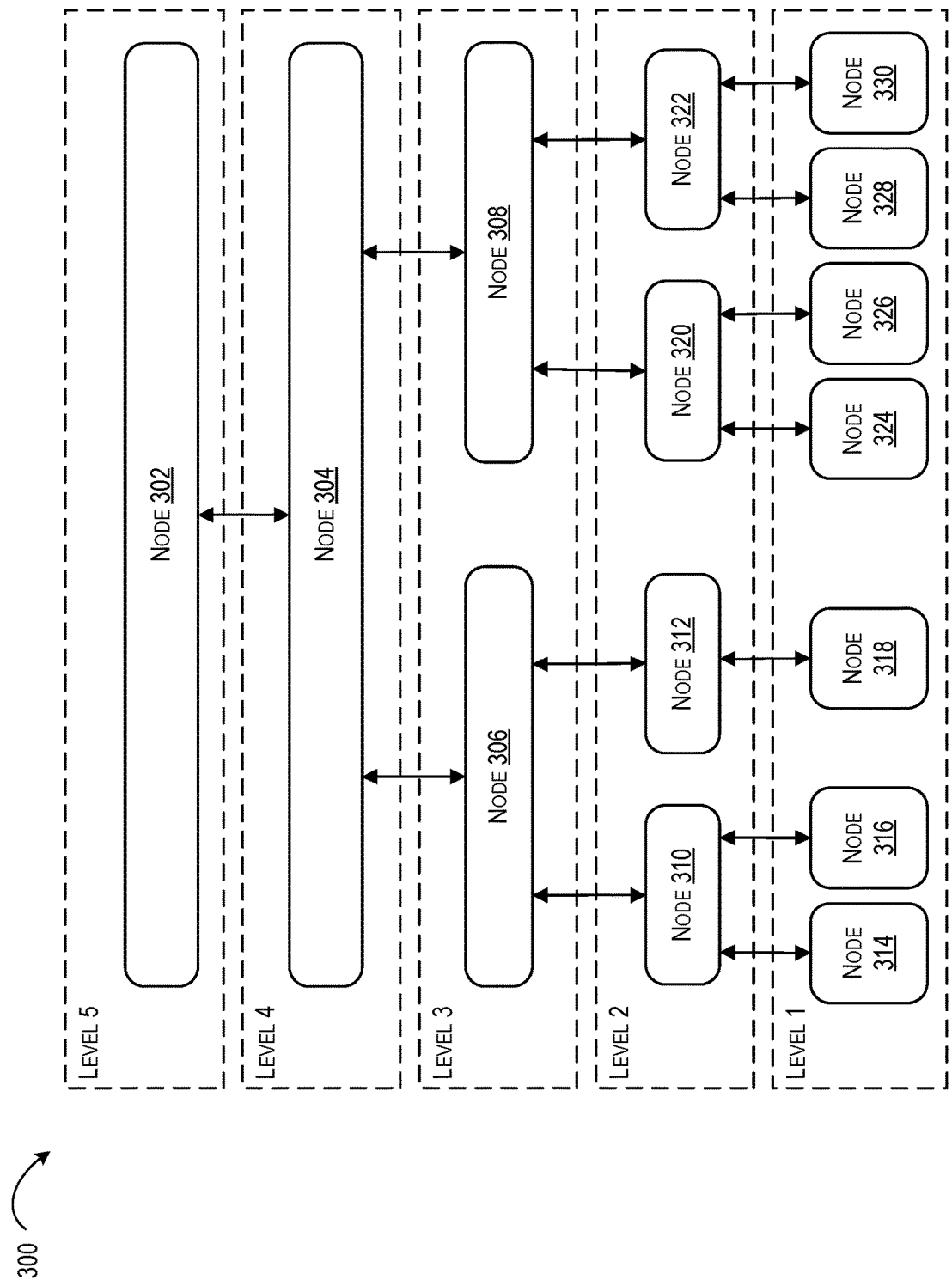
FIG. 3 illustrates an example power distribution hierarchy corresponding to the arrangement of the components of FIG. 2, in accordance with at least one embodiment.

FIG. 3 illustrates an example of a power distribution hierarchy 300 corresponding to an arrangement of the components of FIG. 2, in accordance with at least one embodiment. Power distribution hierarchy 300 may represent an arrangement of any suitable number of components of a power system such as the power distribution infrastructure components discussed in connection with power distribution infrastructure 200 of FIG. 2. The power distribution hierarchy 300 may include any suitable number of nodes organized according to any suitable number of levels. Each level can include one or more nodes. A root level (e.g., level 5) may include a single root node of the power distribution hierarchy 300. Each node of the power distribution hierarchy 300 may represent a corresponding component of the power distribution infrastructure 200. A set of one or more nodes of a given level may descend from a particular node corresponding to a higher level of the power distribution hierarchy 300. A set of lower-level components that are represented by nodes of a lower level (e.g., level 1), may receive power distributed through a higher-level component represented by a node of level 2 (e.g., a component that is upstream from the lower-level components), which in turn receives power from a higher-level component represented by a node of level 3, which receives power from a higher-level component represented by a node of level 4. In some embodiments, every component of the power system receives power that is initially distributed through a component corresponding to a node (e.g., node 302, a root node) of level 5 (e.g., the highest level of the power distribution hierarchy 300). Node 302 may receive power from a utility power source (e.g., a local electric utility system).

As depicted, power distribution hierarchy 300 includes node 302 of level 5. In some embodiments, node 302 may represent an uninterrupted power supply of UPS(s) 202 of FIG. 2. The component corresponding to node 302 may distribute/supply power to a component corresponding to node 304 of level 4. A component (e.g., a lower-level component) that receives power from a higher-level component (a component represented by a node of a higher level of the power distribution hierarchy 300 than the level of the node representing the lower-level component) may be considered to be subordinate to the higher-level component. In some embodiments, node 304 may represent a component such as one of the intermediate PDU(s) 204 of FIG. 2 (e.g., a switchboard) that is subordinate to the UPS represented by node 302. The component represented by node 304 may be configured to distribute/supply power to components respectively represented by nodes 306 and 308.

Nodes 306 and 308 of level 3 may each represent a respective component (e.g., respective row PDU(s)) of FIG. 2. The component corresponding to node 306 (e.g., row PDU 206, a bus bar) may distribute/supply power to a component corresponding to node 310 (e.g., rack PDU 208A of FIG. 2) and a component corresponding to node 312 (e.g., rack PDU 208N of FIG. 2). A component corresponding to node 310 (e.g., rack PDU 208A) may distribute/supply power to components corresponding to nodes 314 and 316 of level 1 (respectively representing servers 212A and 212B of FIG. 2) which may be monitored/managed by a component of servers 212A and 212B such as power controllers 216A and 216B. The components corresponding to nodes 314 and 316 may be arranged in the same rack.

A component corresponding to node 312 (e.g., rack PDU 208A) may distribute/supply power to a component corresponding to node 318 of level 1 (e.g., server 214C of FIG. 2 including power controller 216C). Nodes 314, 316, and 318 of level 1 may be arranged and/or associated with the same row (e.g., row 210 of FIG. 2).

Returning to node 308 of level 3, node 308 (e.g., a different row PDU, a remote power panel, for example) may distribute/supply power to a component corresponding to node 310 (e.g., rack PDU 208A of FIG. 2) and a component corresponding to node 312 (e.g., rack PDU 208N of FIG. 2). A component corresponding to node 320 (e.g., a rack PDU) may distribute/supply power to components corresponding to nodes 322 and 326 of level 1 (e.g., corresponding to respective servers including respective power controllers). The components corresponding to nodes 324 and 326 may be arranged in the same rack. A component corresponding to node 322 (e.g., another rack PDU) may distribute/supply power to components corresponding to nodes 328 and 330 of level 1 (e.g., corresponding to respective servers including respective power controllers). The components corresponding to nodes 328 and 330 may be arranged in the same rack.

The particular number of components (e.g., corresponding to the nodes of level 1) receiving power distributed from a higher-level component (e.g., corresponding to a node of level 2) may vary from the number shown in FIG. 3. The particular number of levels within a power distribution hierarchy may vary depending on the particular arrangement of the components used in a given datacenter. It is contemplated that each non-root level (e.g., in the example of FIG. 3, levels 1-4) may include a different number of nodes representing a different number of components then the number of nodes depicted in each non-root level of FIG. 3. Nodes may be arranged in a different, but similar configuration as the one depicted in FIG. 3.

Figure 4:
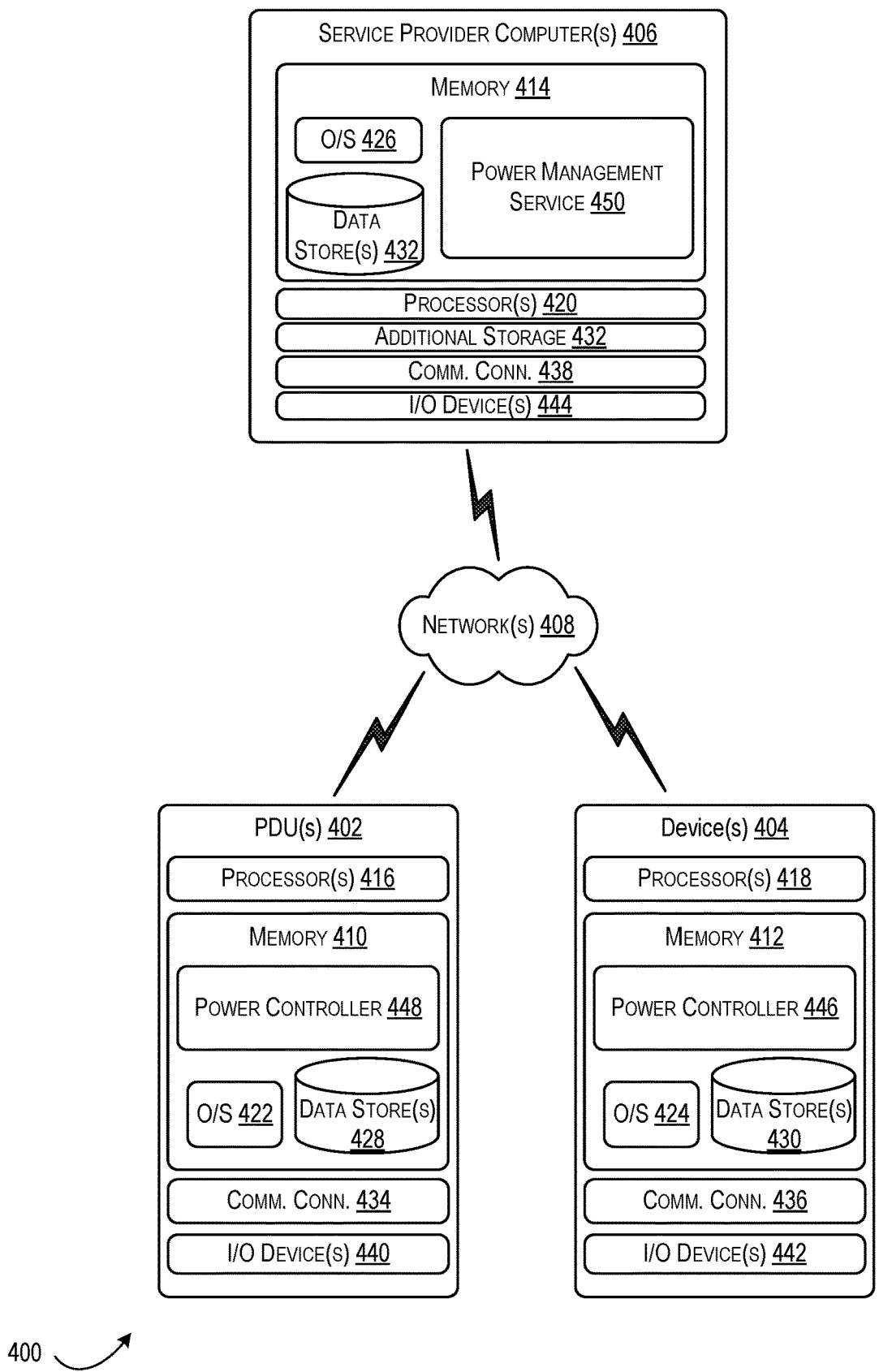
FIG. 4 illustrates an example power management system for managing power allocation and consumption across components of a datacenter, in accordance with at least one embodiment.

FIG. 4 illustrates an example power management system 400 ("system 400," for brevity) for managing power allocation and consumption across components of a datacenter, in accordance with at least one embodiment. Allocating power may refer to a process of assigning a budgeted amount of power (e.g., an expected amount of load/power draw) to any suitable component. The system 400 may include PDU(s) 402, device(s) 404, and service provider computer(s) 406. PDU(s) 402 may be examples of any suitable power distribution unit discussed above in connection with FIG. 2 (e.g., UPS(s) 202, intermediate PDU(s) 204, row PDU 206, rack PDU(s) 208, etc.). By way of example, the PDU(s) 402 may be examples of rack PDU(s) 208 of FIG. 2. Device(s) 404 may be examples of servers and/or networking devices to which PDU(s) 402 distribute power.

PDU(s) 402, device(s) 404, and service provider computer(s) 406 may communicate via one or more wired or wireless networks (e.g., network(s) 808). In some embodiments, the network(s) 408 may include any one or a combination of many different types of networks, such as cable networks, the Internet, wireless networks, cellular networks, and other private and/or public networks.

The device(s) 404 may be any suitable type of computing device such as, but not limited to a server device, a networking device, or any suitable device within a datacenter. In some embodiments, the PDU(s) 402 and device(s) 404 are arranged in a power distribution hierarchy such as the power distribution hierarchy 300 discussed in connection with FIG. 3. In some embodiments, the device(s) 404 may correspond and be represented by the level 1 nodes of power distribution hierarchy 300. PDU(s) 402 may correspond and be represented by higher-level nodes of the power distribution hierarchy (e.g., level 2 nodes).

Each of the PDU(s) 402, device(s) 404, and service provider computer(s) 406 may include at least one memory (e.g., memory 410, memory 412, and memory 414, respectively) and one or more processing units (e.g., processor(s) 416, processor(s) 418, and processor(s) 420, respectively). The processor(s) 416-420 may each be implemented as appropriate in hardware, computer-executable instructions, firmware, or combinations thereof. Computer-executable instruction or firmware implementations of the processor(s) 416-420 may include computer-executable or machine-executable instructions written in any suitable programming language to perform the various functions described.

The memories 410-414 may store program instructions that are loadable and executable on the respective processor(s) of the given device, as well as data generated during the execution of these programs. Depending on the configuration and type of user computing device, the memories 410-414 may be volatile (such as random-access memory (RAM)) and/or non-volatile (such as read-only memory (ROM), flash memory, etc.). The PDU(s) 402, device(s) 404, and service provider computer(s) 406 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memories 410-414 may individually include multiple different types of memory, such as static random-access memory (SRAM), dynamic random-access memory (DRAM), or ROM.

Turning to the contents of the memories 410-414 in more detail, the memories 410-414 may include an operating system (e.g., operating system 422, operating system 424, and operating system 426, respectively), one or more data stores (e.g., data store(s) 428, data store(s) 430, and data store(s) 432, respectively), and one or more application programs, modules, or services.

The PDU(s) 402, device(s) 404, and service provider computer(s) 406 may include communications connection(s) (e.g., communication connection(s) 434, communication connection(s) 436, and communication connection(s) 438, respectively) that allow the PDU(s) 402, device(s) 404, and service provider computer(s) 406 to communicate with one another via the network(s) 408. The PDU(s) 402, device(s) 404, and service provider computer(s) 406 may also include I/O device(s) (e.g., I/O device(s) 440, I/O device(s) 442, and I/O device(s) 444, respectively), such as a keyboard, a mouse, a pen, a voice input device, a touch input device, a display, speakers, a printer, etc. in some embodiments, the service provider computer(s) 406 may be one of the device(s) 404.

Any suitable combination of device(s) 404 (e.g., servers 104 of FIG. 1, servers 214 of FIG. 2, etc.) may include a respective power controller (e.g., power controller 446). Power controller 446 may be an example of the power controllers 216 of FIG. 2. Power controller 446 may be any suitable hardware or software component operating at a device (e.g., a server) that is configured to monitor and/or manage power consumption at the device. Power controller 446 may individually monitor the power consumption of the respective device on which it operates. Power controllers 446 may each be configured enforce power cap limits to constrain power consumption at the respective device. Enforcing power cap limits may include monitoring power consumption at the device, determining whether to constrain (e.g., limit, restrict, etc.) power consumption at the device (e.g., based at least in part on a comparison between the device's current consumption and a stored power cap limit), and limiting/restricting power consumption at the device (e.g., using dynamic voltage and/or frequency scaling with processor(s) 418 and/or memory 412 to suppress power consumption at the device). Any suitable operation associated with power capping may be implemented by power controller 446.

In some embodiments, power controller 446 may communicate via direct connection (e.g., via cable) and/or via network(s) 408 with power controller 448. Power controller 446 may provide power consumption data indicating the device's current power consumption (e.g., a cumulative power consumption over a time period, a current rate of power consumption, etc.). Power consumption data can be provided to power controller 448 at any suitable frequency, periodicity, or according to a predefined schedule or event (e.g., upon breaching a predefined consumption threshold, upon a threshold amount of change in a rate of consumption, upon determining that one or more predefined conditions are met, upon determining a thermal attribute of the device, or the like).

In some embodiments, power controller 446 may receive a power cap value (also referred to as a "power cap") from power controller 448. In some embodiments, additional data may be provided with the power cap value. By way of example, an indicator may be included with the power cap value that indicates whether the power cap value is to be applied immediately. In some embodiments, a received power cap may be applied/enforced immediately by default. In other embodiments, a received power cap may not be applied/enforced immediately by default.

When applying/enforcing a power cap, the power controller 446 may monitor power consumption at the device. This may include utilizing metering devices (e.g., examples of I/O device(s) 442) or software to identify/calculate power consumption data for the device (e.g., cumulative power consumption over a time period, a current rate of power consumption, a current change in the rate of power consumption over a time window, etc.). As part of applying/enforcing a power cap (also referred to as "power capping"), the power controller 446 may determine whether to constrain (e.g., limit, restrict, etc.) power consumption at the device (e.g., based at least in part on comparing the device's current rate of consumption and a stored power cap value). When constraining power consumption at the device, the power controller 446 may limit/restrict power consumption at the device (e.g., using dynamic voltage and frequency scaling with processor(s) 418 and/or memory 412 to suppress power consumption at the device). In some embodiments, the power controller 446 may execute instructions to limit/restrict the power consumption of the device when the device's current consumption data (e.g., a cumulative consumption amount, a rate of consumption over a time window, etc.) approaches the power cap value being enforced (e.g., breaches a threshold that is less than the power cap value). When constraining/restricting the power consumption at the device (also referred to as "throttling"), the power controller 446 ensures that the power consumption of the device remains under the power consumption indicated by the power cap value.

In some embodiments, the power controllers of device(s) 404 may be configured to allow the device(s) 404 to run unconstrained (e.g., without restricting based on power consumption and a power cap) until instructed to apply/enforce a power cap by the power controller 448. In some embodiments, the power controller 446 may receive a power cap value that it may or may not later be instructed to enforce, but when received, the power cap value may be stored in memory 412 without being utilized for power management at the device. Therefore, in some embodiments, the power controller 446 may refrain from commencing with power capping operations (e.g., the comparisons and determinations described above) until instructed to do so (e.g., via an indicator provided by power controller 448). The indication to commence enforcement of a power cap can be received with the power cap value or may be received as a separate communication from power controller 448.

According to power distribution hierarchy 300, each power controller of PDU(s) 402 (e.g., power controller 448) may be configured to distribute, manage, and monitor power with respect to any suitable number of device(s) 404 (e.g., a rack of servers including servers 212A and 212B as depicted in FIG. 2). In some embodiments, the power controller 448 may be a computing agent or program installed at a given PDU (e.g., rack PDU 208A of FIG. 2). The power controller 448 may be configured to obtain power consumption data from the device(s) 404 corresponding to the devices it relates (e.g., the devices for which the given PDU operating remote controller 448 is configured to distribute, manage, or monitor power). Power controller 448 may receive the consumption data according to a predefined frequency, periodicity, or schedule implemented by power controller 446, and/or the power controller 448 may receive the consumption data in response to requesting the consumption data from power controller 446. The power controller 448 may be configured to request consumption data from the power controller 446 according to a predefined frequency, periodicity, or schedule implemented by power controller 448.

The power controller 448 may transmit received consumption data to power management service 450 implemented by service provider computer(s) 406 at any suitable time, according to any suitable frequency, periodicity, or schedule, or as a result of one or more predefined conditions being met (e.g., a change in a rate of individual/cumulative/collective consumption of the device(s) 404 breaches a threshold). In some embodiments, the power controller 448 may aggregate the consumption data received from the device(s) 404 (e.g., via the power controller 446 of each device) prior to transmitting the aggregated consumption data to power management service 450. In some embodiments, the consumption data may be aggregated by device or across all of the device(s) 404.

The power controller 448 may receive at any suitable time one or more power cap values corresponding to device(s) 404. These power cap value(s) may be calculated by power management service 450. These calculations will be discussed in further detail with respect to FIG. 5. In some embodiments, the power controller 448 may receive a timing value with the power cap value indicating a duration to be used for a timer. The power controller 448 may be configured to generate and initiate a timer with an associated duration/time period corresponding to the timing value. Upon expiration of the timer indicating the time period corresponding to the time period has elapsed, the power controller 448 may transmit data to one or more devices including an indicator or other suitable data that instructs the one or more devices to proceed with power capping using the power cap value previously stored at each device. In some embodiments, the power cap value may be provided with the indicator. In other embodiments, the power cap value may be provided by the power controller 448 to the power controllers of the devices (e.g., power controller 446) immediately after receiving the power cap value(s) from the power management service 450. Thus, in some embodiments, the power cap values may be transmitted by the power controller 448 to the power controller 446, stored in memory 412, but not enforced by power controller 446 until power controller 446 receives the subsequent data from power controller 448 that instructs the power controller 446 to commence power capping.

The service provider computer(s) 406, perhaps arranged in a cluster of servers or as a server farm, may implement power management service 450. In some embodiments, the functionality described in connection with service provider computer(s) 406, including the functionality described in connection with power management service 450, is executed by one or more virtual machines that are implemented in a hosted computing environment (e.g., on device(s) 404, corresponding to any suitable number of servers 104 of FIG. 1). The hosted computing environment may include one or more rapidly provisioned and released computing resources, which computing resources may include computing, networking and/or storage devices. A hosted computing environment may also be referred to as a cloud-computing environment. A number of example cloud-computing environments are provided and discussed below in more detail with respect to FIGS. 10-14.

The power management service 450 may be configured to receive consumption data from PDU(s) 402 (e.g., from power controller 448). As described above, the consumption data may be aggregated or cumulative with respect to one or more devices. As a non-limiting example, an instance of consumption data received by power management service 450 may include the cumulative/aggregated consumption data for every device relating to (e.g., managed by) a given PDU. By way of example, the PDU providing the consumption data may be a rack PDU and the consumption data provided by that PDU may include the cumulative/aggregated and/or individual consumption data values for every device in the rack. In some embodiments, the cumulative/aggregate consumption data values may additionally include a power consumption of the PDU. The power management service 450, from this consumption data, may access to individual and/or aggregated or cumulative power consumption data with respect to individual devices or all of the devices to which that instance of consumption data relates. The power management service 450 may be configured to perform any suitable operation (e.g., aggregating consumption data, calculating power cap values, calculating timing values, determining budgeted power, identifying whether power capping is needed (e.g., when aggregated consumption data breaches/is likely to breach budgeted power, etc.) based at least in part on data representing the power distribution hierarchy 300 and/or any suitable configuration data identifying the arrangement of the components within the datacenter (e.g., indicating which devices distribute power to which devices). By way of example, the configuration data may include data representing power distribution hierarchy 300.

The power management service 450 may calculate aggregated/cumulative consumption data to identify aggregated/cumulative consumption data with respect to one or more devices at a higher level of the of the power distribution hierarchy 300. By way of example, the power management service 450 may utilized consumption data provided by one or more rack PDUs and calculate aggregated/cumulative consumption data for a row device. For example, consumption data corresponding to devices represented by level 1 nodes of FIG. 3 that share a common set of nodes up to level 3 of the hierarchy. In this case, the common level 3 nodes represents a row PDU such as a bus bar. In some embodiments, consumption data indicating the power consumption of the one or more rack PDUs (e.g., examples of components corresponding to level 2 of the power distribution hierarchy 300) may be included in the consumption data provided to power management service 450. The consumption data provided by the rack PDUs may be provided according to any suitable frequency, periodicity, or schedule, or in response to a request transmitted by power management service 450. Power management service 450 may obtain consumption data relating to any suitable number of device(s) 404 and/or racks of device(s) 404 and may aggregate or calculate any suitable consumption data corresponding to any suitable number of components represented by any suitable node and/or level of power distribution hierarchy 300.

The power management service 450 may be configured to calculate one or more power caps (e.g., power cap values for one or more servers to which power is distributed by a higher-level device (e.g., in this example, a row-level device) based at least in part on allocated power values (e.g., an amount of budgeted power) for that higher-level component. The higher-level component may correspond to any suitable level (e.g., levels 2-5) of the power distribution hierarchy 300 other than the lowest level (e.g., level 1). By way of example, the power management service 450 may calculate power cap values for servers to which power is distributed by a given row device (e.g., a bus bar). These calculations may be based on consumption data provided by the rack PDUs to which power is distributed by the row device. In some embodiments, the power management service 450 may store consumption data for subsequent use. The power management service 450 may utilize historical consumption data when calculating these power cap values. In some embodiments, the power management service 450 may obtain, utilize, and/or train one or more machine-learning models to identify, from historical consumption data, particular power cap values for one or more device(s) 404 (e.g., components corresponding to level 1 of the power distribution hierarchy). These techniques are discussed in more detail with respect to FIG. 7.

The power management service 450 may calculate a timing value for a timer (e.g., a timer that may be initiated and managed by the PDU(s) 402). The timing value may be calculated based at least in part on any suitable combination of: a rate of change in the power consumption of a higher-level component, a direction of change (increasing/decreasing) of the power consumption of the higher-level component, a power spike tolerance of the higher-level component and/or of the system 400 as a whole, or an enforcement time associated for lower-level devices (e.g., a presumed/known delay between when each of the device(s) 404 are instructed to enforce power cap values and when each of device(s) 404 will be actively enforcing the cap (e.g., a first time at which power consumption at that device is constrained/throttled, or at least a determination of whether to constrain/throttle is made).

The power management service 450 may communicate calculated timing values to the PDU(s) 402 at any suitable time. In some embodiments, the power management service 450 may initially determine power caps for a given higher-level component (e.g., a row component) without regard to consumption occurring with respect to other components of the same level (e.g., other row components). In some embodiments, while the timer is being initialized or elapsing, or at any suitable time, the power management service 450 may process consumption data corresponding to other same-level components to determine if power capping downstream components of one or more of those same-level components is more desirable. In some embodiments, the power management service 450 may utilize a priority associated with the device(s) 404 and/or the workloads running on those device(s) to determine power cap values. The power management service 450 may be configured to favor power capping lower-priority device(s)/workload(s) while leaving device(s)/workload(s) with higher priority values unconstrained. In some embodiments, the power management service 450 may be configured to favor power capping a set of highest consuming devices (e.g., across one row, across rows, etc.) while leaving lower consuming devices to operate unconstrained. In some embodiments, the particular consumption of one device, even if the device is included in the set of highest consuming devices, may be left unconstrained if the priority associated with that device and/or workload is high (or higher than priorities associated with other devices and/or workloads). Thus, the power management service 450 may be configured to prioritize the priority of the device/workload over the power consumption of that particular device.

In some embodiments, power cap values may be initially determined by the power management service for a given row. Those power cap values may be provided to the power controller 448 which, in turn, may distribute the power cap values to power controller 446 for storage at the device(s) 404. The power management service 450 may process consumption data with respect to other row devices of the same row to determine power cap values for devices corresponding to different row. This may be advantageous since devices managed by another row may not be consuming their budgeted power, leaving some amount of power unutilized at that row-level device. In some embodiments, the power management service 450 may be configured to determine whether power capping the devices of one row, while allowing at least some devices of another row to operate unconstrained may be more advantageous. Determining a benefit for a set of power cap values may be based at least in part on minimizing a number of devices to be power capped, minimizing priority values associated with the devices to be power capped, maximizing the number of devices associated with particular high priority values that will not be power capped, and the like. The power management service 450 may utilize a predefined protocol (e.g., a set of rules) to determine whether enforcement of the power cap values it already sent to one PDU is more or less advantageous/beneficial than different power capping values it has identified based on processing consumption data from multiple PDUs associated with one or more other rows.

The power management service 450 may be configured to enact the enforcement of the set of power cap values that are determined to be more advantageous to ensure that one or more circuit breakers within the datacenter are not tripped. In some embodiments, a set of power cap values that are determined to be most advantageous may be selected. If the set of power caps previously provided to power controller 448 is not determined to be more advantageous, the power management service 450 may transmit data to the power controller 448 to cause the power controller 448 to transmit the indicator to device(s) 404 (e.g., power controller 446) to commence power capping based on the power caps previously distributed. Alternatively, if the power management service 450 determines the new set of power caps are more (or most) advantageous from a power management perspective, it may transmit data to the power controller 448 to cancel the timer. In some embodiments, canceling the timer may cause the previously distributed power caps to be deleted by instruction from the power controller 448 (e.g., transmitted in response to canceling the timer), or those power caps may time out by default (e.g., according to a predefined time period). The power management service 450 may transmit the new power caps to the appropriate PDUs (which may include or exclude the same PDU to which the previous set of power caps was transmitted) with an indication that the power caps are to be immediately enforced by the corresponding devices. These PDUs may transmit those power caps with an instruction to the receiving device to immediately commence power capping operations (e.g., including monitoring consumption with respect to the power cap value, determining whether the cap based on the power cap value and current consumption of the device, and cap or leave unconstrained the operations of the device based on the determination).

In some embodiments, if the timer expires at the original PDU (e.g., a time period corresponding to the timing value elapses), and a cancellation from the power management system 450 has not been received, the power controller 448 may automatically instruct the device(s) 404 to commence power capping operations with the power cap values stored. This technique ensure a failsafe for when, for any reason, the power management service 450 fails to instruct the PDU or cancel the timer.

The techniques described above enable more lower-level devices to run unconstrained by minimizing the number and/or frequency at which those devices' power consumption is capped. Additionally, devices downstream in the hierarchy to a given device may be allowed to peak past the device's budgeted power while still ensuring that the device's maximum power capacity (a value higher than that of the budgeted value) is not exceeded. This enables consumption of low-level devices to cause consumption levels at the higher device to operate within the buffer of power that conventional systems left unutilized. The system and the techniques described allow more efficient utilization of the power distribution components of the system 400 and reduce waste while ensuring that power failures are avoided.

Figure 5:
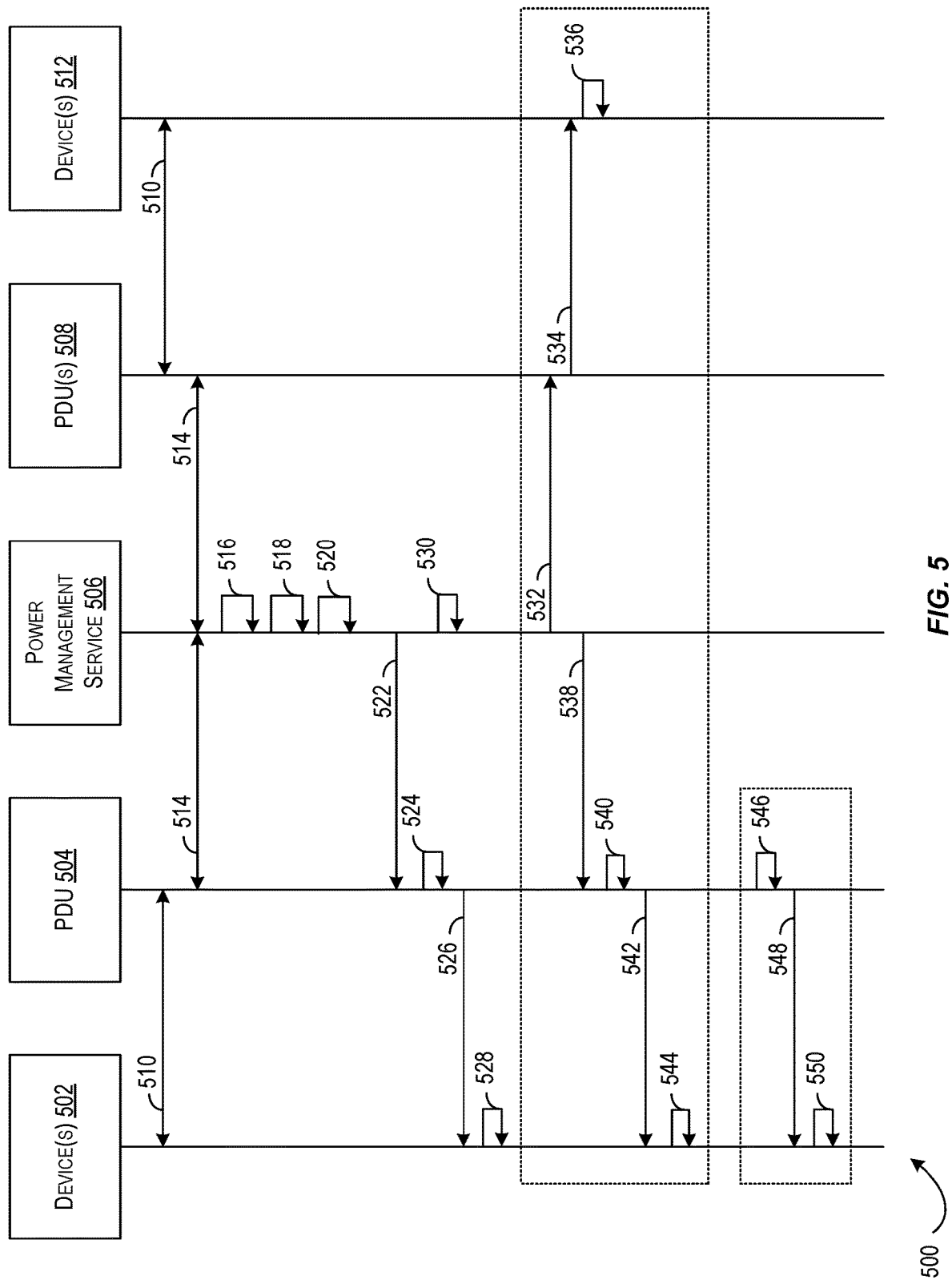
FIG. 5 is a flow diagram illustrating an example method for managing excessive power consumption, in accordance with at least one embodiment.

FIG. 5 is a flow diagram illustrating an example method 500 for managing excessive power consumption, in accordance with at least one embodiment. The method 500 may include more or fewer operations than those depicted or describes with respect to FIG. 5. The operations may be performed in any suitable order.

The method 500 may begin at 510, where consumption data may be received and/or obtained (e.g., by request) by PDU 504 from device(s) 502. Device(s) 502 may be examples of the device(s) 404 of FIG. 4 (e.g., a number of servers) and may be arranged within a common server rack (or at least configured to receive power from PDU 504). PDU 504 is an example of the PDU(s) 402 of FIG. 4 (e.g., rack PDU 208A of FIG. 2). Each of the device(s) 502 may be a device to which PDU 504 distributes power. PDU(s) 508 may be examples of other rack PDUs associated with the same row as PDU 504 and thus, receiving power from the same row PDU (e.g., row PDU 206 of FIG. 2, corresponding to node 306 of FIG. 3) as PDU 504. The consumption received from PDU(s) 508 may correspond to the power consumption of device(s) 512. In some embodiments, at least some portions of PDU(s) 508 and device(s) 512 correspond to a row that is different from the row corresponding to device(s) 502. In some embodiments, any suitable number of instances of consumption data (referred to as "device consumption data") received by PDU 504 may relate to a single device of device(s) 502. The same may be true of the device consumption data received by PDU(s) 508. In some embodiments, PDU 504 and PDU(s) 508 may aggregate and/or perform calculations from the device consumption data instances received to generate rack consumption data corresponding to each respective PDU. For example, PDU 505 may generate rack consumption data from the device consumption data provided by device(s) 502. The rack consumption data may include the device consumption data instances received by the PDU 504 at 510. Similarly, the rack consumption data provided by PDU(s) 508 may include device consumption instances received from device(s) 512. The rack consumption data generated by PDU 504 and/or PDU(s) 508 may be generated based at least in part on the power consumption of PDU 504 and/or PDU(s) 508, respectively.

At 514, the power management service 506 (an example of power management service 450 of FIG. 4) may receive and/or obtain (e.g., via request) rack consumption data from any suitable combination of PDU 504 and PDU(s) 508 (also examples of PDU(s) 402 of FIG. 4), not necessarily at the same time. In some embodiments, power management service 506 may receive/obtain rack consumption data from PDUs 504 and PDU(s) 508 on an ongoing basis. PDU 504 and PDU(s) 508 may likewise receive and/or obtain (e.g., via request) device consumption data from device(s) 502 and 512, respectively (e.g., from corresponding power controllers of those devices, each power controller being an example of the power controller 446 of FIG. 4). The PDU(s) 508 may correspond to PDUs associated with the same row as PDU 504.

At 516, the power management service 506 may determine whether to calculate power cap values for device(s) 502 based at least in part on maximum and/or budgeted power amounts associated with another PDU (e.g., a row-level device not depicted in FIG. 5, such as bus bar) and the consumption data received from PDU 504 and/or PDU(s) 508. In some embodiments, the power management service 506 may access these maximum and/or budgeted power amounts associated with, for example, a row-level PDU (e.g., row PDU 206 of FIG. 2, not depicted here), from stored data or the maximum and/or budgeted amounts may be received by the power management service 506 at any suitable time from the PDU (the row-level PDU) to which the maximum and/or budgeted power amounts relate. The power management service 506 may aggregate the rack consumption data from PDU 504 and/or PDU(s) 508 to determine a cumulative power consumption value with respect to the row-level device (e.g., total power consumption from devices downstream of the row-level device within a last time window, a change of the rate of consumption from the perspective of the row level device, a direction of change of the rate of consumption from the perspective of the row-level device, a time period needed to commence power capping at one or more of device(s) 502 and/or 512, or the like). In some embodiments, the power management service 506 may generate additional cumulative power consumption data from at least some portion of the cumulative power consumption data values and/or using historical device consumption data (e.g., cumulative or individual consumption data). For example, the power management service 506 may calculate any suitable combination of: a change of the rate of consumption from the perspective of the row-level device, a direction of change of the rate of consumption from the perspective of the row-level device, or the like, based at least in part on historical consumption data (e.g., historical device consumption data and/or historical rack consumption data corresponding to device(s) 502 and/or 512).

The power management service 506 may determine that power cap values should be calculated if the cumulative power consumption (e.g., power consumption corresponding to device(s) 502 and 512) exceeds a budgeted amount of power associated with the row-level PDU. If the cumulative power consumption does not exceed the budget amount associated with the row-level PDU, the power management service 506 may determine power caps should not be calculated and the method 500 may conclude. Alternatively, the power management service may determine power caps should be calculated due to the cumulative power consumption of downstream devices (e.g., device(s) 502 and 512) exceeding the budget amount associated with the row-level PDU and may proceed to 518.

In some embodiments, the power management service 506 may additionally or alternatively determine that power cap values should be calculate at 516 based at least in part on providing historical consumption data (e.g., device consumption data and/or rack consumption data corresponding to device(s) 502 and/or 512) as input data to one or more machine-learning models. The machine-learning model(s) may be trained using any suitable supervised or unsupervised machine-learning algorithms to identify from historical consumption data provided as input a likelihood that consumption corresponding to the devices associated with the historical consumption data will exceed a budgeted amount (e.g., a budgeted amount of power allocated to a row-level device). The machine-learning model(s) may be trained using corresponding training data sets including historical consumption data instances. The training of these machine-learning model(s) is discussed in more detail with respect to FIG. 6. Using the techniques described above, the power management service 506 may identify that power cap values are to be calculated based on cumulative device/rack consumption levels exceeding the budgeted power associated with the row-level device and/or based on determining, from the output of the machine-learning model(s), that the cumulative device/rack consumption levels are likely to exceed the budgeted power associated with the row-level device. Determining that the device/rack consumption levels are likely to exceed the budgeted power of the row-level device may be determined based on receiving an output from the machine-learning model(s) that indicates a likelihood (e.g., likely/unlikely) or by comparing the output value (e.g., a percentage, a confidence value, etc.) indicating the likelihood of exceeding the budgeted power of the row-level device to a predefined threshold. An output value indicating a likelihood that exceeds the predefined threshold may result in the power management service 506 determining that power capping is warranted and that power cap values are to be calculated.

At 518, the power management service 506 may calculate power cap values for any suitable number of device(s) 502 and/or device(s) 512. By way of example, the power management service 506 may utilize the device consumption data and/or rack consumption data corresponding to each of the device(s) 502 and 512. In some embodiments, the power management service 506 may determine a difference between the cumulative power consumption (calculated from aggregating the device and/or rack consumption data corresponding to device(s) 502 and device(s) 512) of a row of devices (e.g., device(s) 502 and any of device(s) 512 of the same row) and the budgeted power associated with the row-level device). The difference may be used to identify an amount by which power consumption is to be constrained at the devices associated with that row. The power management service 506 may determine power cap values for any suitable combination of the device(s) 502 and/or 512 for devices of the same row based on identifying that power cap values that, if enforced by the devices, will result in a reduction of power consumption to a value that is less than the budgeted power associated with the row-level device.

In some embodiments, the power management service 506 may determine particular power cap values for any suitable combination of the device(s) 502 and 512 corresponding to the same row based at least in part on the consumption data and/or priority values associated with those devices and/or the workloads associated with those the devices' power consumption. In some embodiments, these priority values may be provided as part of the device consumption data provided by the device to which that consumption data relates, or the priority values may be ascertained based at least in part on a type of device, a type of workload, or the like, obtained from the consumption data or any other suitable source (e.g., from separate data accessible to the power management service 506). Using the priority respectively associated with the device or workload, the power management service 506 may calculate power cap values in a manner that favors power capping devices associated with lower priority workloads over power capping devices with higher priority workloads. In some embodiments, the power management service 506 may calculate power cap values based at least in part on favoring power capping devices that are consuming at higher rates (e.g., a set of highest consuming devices) over that of power capping other devices that are consuming at lower rates. In some embodiments, the power management service 506 may calculate power cap values based at least in part on a combination of factors including the consumption values for each device and the priority associated with the device or the workload being executed by the device. The power management service 506 may identify power cap values for the devices that avoid capping a high consuming device and/or a high priority device altogether, or that cap those devices to a lesser degree than devices consuming less power and/or being associated with a lower priority.

At 520, the power management service 520 may calculate a timing value corresponding to a duration for a timer to be initialized and managed by a PDU (e.g., PDU 504). The timing value may be calculated based at least in part on any suitable combination of a rate of change of the power consumption from the perspective of the row-level device, a direction of change of the power consumption from the perspective of the row-level device, or a time to perform the power capping at each of the devices to which the power caps calculated at 518 relate. By way of example, the power management service 520 may determine a timing value based on determine a relatively large increase in power consumption from the perspective of the row-level device that is greater than a timing value for a smaller increase in power consumption from the perspective of the row-level device. Therefore, the greater the increase in the rate of power consumption is, the smaller the timing value (corresponding to a shorter timer), while a smaller increase in the rate of power consumption may result in a larger timing value (corresponding to a longer timer). Similarly, a first timing value calculated may be less than a second timing value calculated when the time to perform the power capping at each of the devices to which the power caps relate is shorter with respect to the calculation of the first timing value. Therefore, the quicker the devices to which power capping is contemplated can enforce the caps, the shorter the timing value may be.

At 522, the calculated power cap value calculated at 518 and/or the timing value calculated at 520 may be transmitted to PDU 504. Although not depicted, the corresponding power cap values and/or timing values for any of device(s) 512 of the same row may be transmitted at 520.

At 524, when a timing value is provided at 522, the PDU 504 may use the timing value to initialize a timer having a duration corresponding to the timing value.

At 526, the PDU 504 may transmit the power cap values (if received at 522) to device(s) 502. Device(s) 502 may store the received power cap values at 528. In some embodiments, the power cap values provided at 526 may include an indicator that indicates enforcement is not to commence, or no indicator may be provided and the device(s) 502 may refrain from commencing power capping by default.

At 530, the power management service 506 may perform a higher-level analysis of device/rack consumption data receive from any of the device(s) 512 that correspond to a different row than the row to which device(s) 502 correspond. As part of this processing, the power management service 506 may identify unutilized power associated with other row-level devices. If unutilized power exists, the power management service 506 may calculate a new set of power cap values based at least in part on the consumption data corresponding to at least one other row of devices. As described above, this may be advantageous since devices managed by another row-level device may not be consuming their budgeted power, leaving unutilized power at that row-level device. In some embodiments, the power management service 450 may be configured to determine whether capping the devices of another row, while allowing at least some devices of device(s) 502 (and potentially some of device(s) 512 corresponding to the same row as device(s) 502) to operate unconstrained may be more advantageous. The benefit of each power capping approach may be calculated based at least in part on minimizing a number of devices to be power capped, minimizing priority values associated with the devices to be power capped, maximizing the number of devices associated with particular high priority values that will not be power capped, and the like. The power management service 506 may utilize a predefined scheme or set of rules to determine whether enforcement of the power cap values it already determined for one row (e.g., corresponding to the power cap values transmitted at 522) is more or less advantageous than different power capping values that have been identified based on processing consumption data from multiple rows.

The power management service 506 may be configured to enact the enforcement of the set of power cap values that are determined to be more (or most) advantageous to ensure that one or more circuit breakers within the datacenter are not tripped. If the set of power caps previously provided to PDU 504 is determined to be less advantageous than the set of power cap values calculated at 530, the power management service 450 may transmit data to PDU 504 immediately to cause the PDU 504 to transmit an indicator to device(s) 502 to immediately commence power capping based on the power caps previously distributed. Alternatively, the power management service 506 may take no further actions, which may allow the timer at PDU 504 to elapse.

Alternatively, if the power management service 450 determines the new set of power caps are more (or most) advantageous from a power management perspective, it may transmit data to the power controller 448 to cancel the timer. The previously distributed power caps may be deleted by instruction from the power controller 448 (e.g., transmitted in response to canceling the timer), or those power caps may time out by default according to a predefined time period. The power management service 450 may transmit the new power caps to the appropriate PDUs (which may include or exclude the same PDU to which the previous set of power caps was transmitted) with an indication that the power caps are to be immediately enforced by the corresponding devices. These PDUs may transmit those power caps with an instruction to the receiving device to immediately commence power capping operations (e.g., including monitoring consumption with respect to the power cap value, determining whether the cap based on the power cap value and current consumption of the device, and cap or leave unconstrained the operations of the device based on the determination).

If the power cap values calculated at 530 are determined to be more advantageous from a power management perspective than the power cap values calculated at 518 and ultimately stored at device(s) 502 at 528, the method 500 may proceed to 532 where the power cap values calculated at 530 may be transmitted to PDU(s) 508 (e.g., any of the PDU(s) 508 that manage devices to which the power cap values relate). In some embodiments, the power management service 506 may provide an indication that the power cap values transmitted at 532 are to be immediately enforced.

In response to receiving the power cap values and indication at 532, the PDU(s) 508 that distribute power to the devices to which those power cap values relate may transmit the power cap values and the indication to the devices to which those power cap values relate. At 536, the receiving devices of device(s) 512 may, based on receiving the indication, execute power capping operations without delay. This includes 1) determining whether to limit/restrict operations based on the current consumption of a given device when compared with the power cap value provided to that device, and 2) limiting/restricting or refraining from limiting/restricting power consumption of that device.

In some embodiments, power management service 506, based at least in part on identifying the power cap values calculated at 530 are more (or most) advantageous than the ones calculated at 518, may transmit data cancelling the timer and/or power cap values that were transmitted at 522. In some embodiments, the PDU 504 may be configured to cancel the timer at 540. In some embodiments, the PDU 504 may transmit data at 542 that causes the device(s) 502 to delete the power cap values from memory at 544.

At 546, in situations where a more advantageous set of power cap values are not found, as described above, or the power management service 506 has not transmitted a cancellation as described above in connection with 538, the PDU 504 may identify that the timer that was initiated at 524 has expired (e.g., a duration corresponding to the timing value provided at 522 has elapsed). As a result, the PDU 504 may transmit an indication to device(s) 502 at 548, instructing the device(s) 502 to commence power capping based on the power cap values stored at the device(s) 502 at 528. Receiving this indication at 548 may cause the device(s) 502 to commence power capping at 550 according to the power cap values stored at 528.

In some embodiments, the PDU 504 may be configured to cancel the timer at any suitable time after the timer is initiated at 524, if the PDU 504 identifies that the power consumption of device(s) 502 has lowered. In some embodiments, this may cause the PDU 504 to transmit data to device(s) 502 to cause the device(s) 502 to discard the previously stored power cap values from local memory.

In some embodiments, the power cap values being enforced at any suitable device may be timed out or may be replaced by power cap values calculated by the power management service 506 at any suitable time. In some embodiments, the power management service 506 may transmit a cancellation or replacement of a power cap value to any suitable device though its corresponding rack PDU. If a cancellation of the power cap value is received, the device may delete the previously stored power cap value, allowing the device to resume operations unconstrained. If a replacement power cap value is received, the device may store the new power cap value and enforce the new power cap value immediately, or when instructed by its rack PDU. In some embodiments, being instructed to enforce the new power cap value by its PDU may cause the device (e.g., the power controller 446) of the device to replace the power cap value that was previously being utilized for power capping with the new power cap value the device is being instructed to enforce.

Any suitable operations of method 500 may be performed at any suitable time on an ongoing basis to manage excessive consumption (e.g., situations in which the consumption of the servers corresponding to a row-level device exceed the row-level device's budgeted power) to enable more efficient use of previously unutilized power while avoiding power outages due to tripped circuit breakers. It should be appreciated that similar operations may be performed by the power management service 506 with respect to any suitable level of power distribution hierarchy 300. Although examples have been provided with respect to monitoring power consumption corresponding to a row-level device (e.g., a device represented by a level 3 node of power distribution hierarchy 300), similar operations may be performed with respect to higher-level devices of any suitable level (e.g., components corresponding to any of levels 2-5 of power distribution hierarchy 300).

Figure 6:
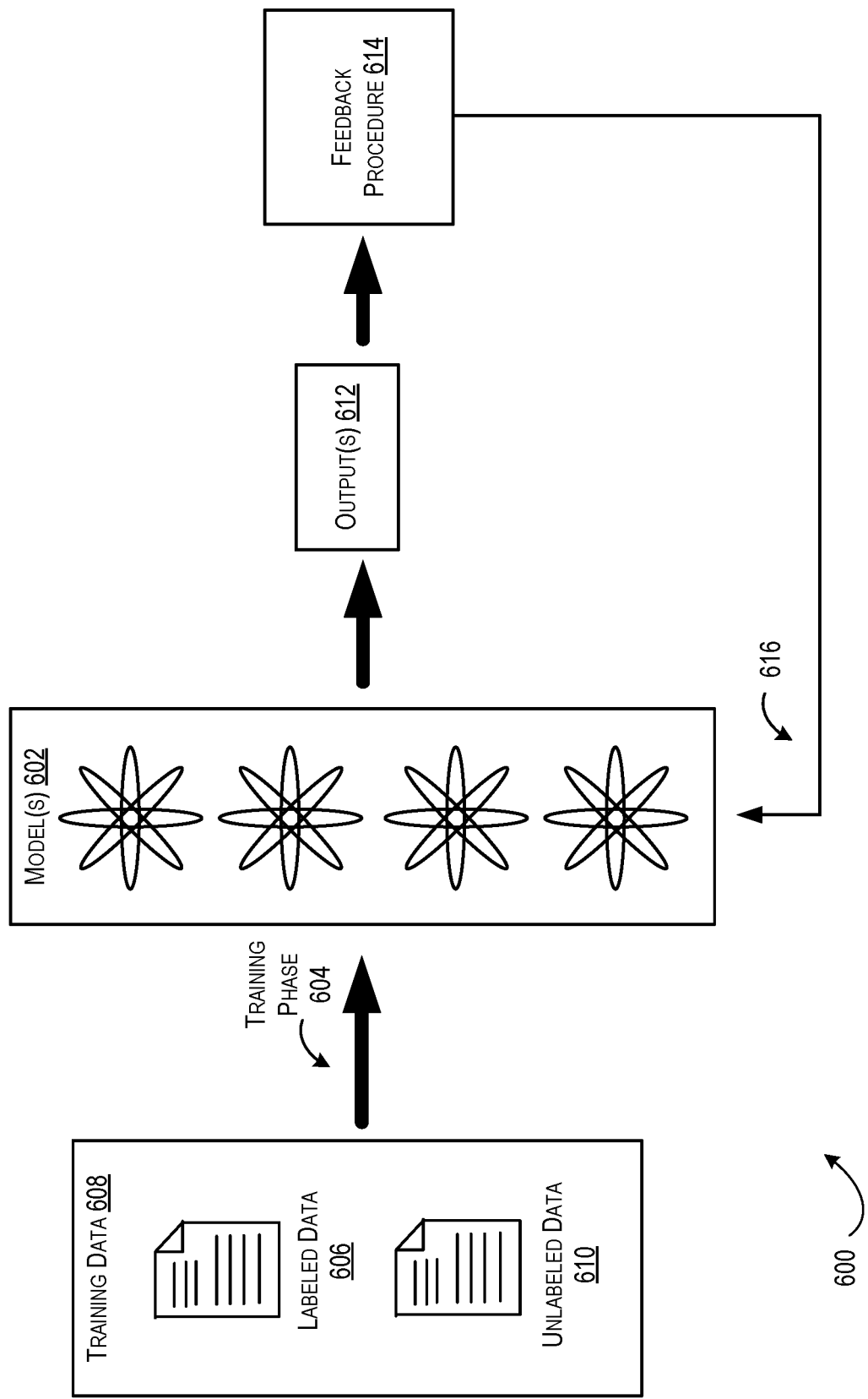
FIG. 6 illustrates a flow depicting an example method for training a machine-learning model to determine a likelihood that aggregate power consumption of downstream devices will exceed a budget threshold corresponding to an upstream device, in accordance with at least one embodiment.

FIG. 6 illustrates a flow depicting an example method 600 for training a machine-learning model to determine a likelihood that aggregate power consumption of downstream devices (e.g., device(s) 502 of FIG. 2) will exceed a budget threshold corresponding to an upstream device (e.g., a row-level device through which power is distributed to device(s) 502), in accordance with at least one embodiment.

In some embodiments, the model(s) 602 may be trained (e.g., by power management service 506 of FIG. 5 or a different device) using any suitable machine-learning algorithms (e.g., supervised, unsupervised, etc.) and any suitable number of training data sets (e.g., training data 608). A supervised machine-learning algorithm refers to a machine learning task that includes learning an inferred function that maps an input to an output based on a labeled training data set for which example input/output pairs are known. Unsupervised machine-learning algorithms refer to a set of algorithms that are used to analyze and cluster unlabeled data sets (e.g., unlabeled data 610). These algorithms are configured to identify patterns or data groupings without the need for human intervention. In some embodiments, any suitable number of model(s) 602 may be trained during training phase 604.

The model(s) 602 may include any suitable number of models. The model(s) 602 may be trained to identify, from the training data 608 discussed below, a likelihood that consumption data associated with downstream devices (e.g., devices to which power is distributed through a row-level device) will breach a budget threshold (e.g., a budgeted amount of power) associated with an upstream device (e.g., a higher-level device such as the row-level device). In some embodiments, the model(s) 602 may be configured to determine and output one or more predicted consumption amount(s) that are likely to occur in the future, and a determination of whether the predicted amount(s) breach a budget threshold (e.g., a budgeted amount of power associated with an upstream device) may be made by the power management service 450 of FIG. 4.

As a non-limiting example, at least one of the model(s) 602 can be trained during training phase 604 using a supervised learning algorithm and labeled data 606 to identify a likelihood value and/or one or more predicted consumption values (e.g., a predicted aggregate/cumulative consumption amount for one or more devices). A likelihood value may be a binary indicator, a percentage, a confidence value or the like that indicates a degree of likelihood. The likelihood value can be a binary indicator that indicates a particular budget amount is likely or unlikely to be breached, or the likelihood value can indicate a likelihood that a particular predicted consumption value will be experienced in the future. Labeled data 606 may be any suitable portion of potential training data (e.g., training data 608) that can be used to train various models to likelihood values. Labeled data 606 may include any suitable number of examples of historical consumption data corresponding to a device and/or a rack to which power passing through the row-level device is distributed. In some embodiments, labeled data 606 may include labels that identify known likelihood values. Using the labeled data 606, a model (e.g., an inferred function) may be learned that maps an input (e.g., one or more instances of historical consumption data corresponding to one or more devices) to an output (e.g., a likelihood that the consumption of the one or more devices will exceed an amount). In some embodiments, the amount to be used may be included in training data 608 and included as input. In some embodiments, the model(s) 602 may provide as output an amount by which the cumulative consumption from the perspective of a given component (e.g., a row-level device) is expected to change and a likelihood or confidence value indicating a likelihood/confidence corresponding to the amount. In some embodiments, the power management service 506 of FIG. 5 may determine that the output(s) 612, including the amount and/or the likelihood value, indicates that the consumption of downstream devices associated with a row-level devices is likely (e.g., over a threshold degree) to breach the budgeted power of the row-level device.

The model(s) 602, and the various type of those models discussed above, may include any suitable number of models that are trained using unsupervised learning techniques to identify the likelihood/confidence that downstream devices associated with a row-level device will breach the budgeted power associated with a row-level device. Alternatively, unsupervised learning techniques may be utilized to identify an amount (and potentially a corresponding likelihood/confidence) that the consumption of downstream devices is predicted to increase. Unsupervised machine-learning algorithms are configured to learn patterns from untagged data. In some embodiments, the training phase 604 may utilize unsupervised machine-learning algorithms to generate one or more models. For example, the training data 608 may include unlabeled data 610 (e.g., historical consumption data instances corresponding to devices and/or racks of devices receiving power through a given row-level device). Unlabeled data 610 may be utilized, together with an unsupervised learning algorithm to segment the entries of unlabeled data 610 into groups. The unsupervised learning algorithm may be configured to cause similar entries to be grouped together in a common group. An example of an unsupervised learning algorithm may include clustering methods such as k-means clustering, DBScan, and the like. In some embodiments, the unlabeled data 610 may be clustered with the labeled data 606 such that unlabeled instances of a given group may be assigned the same labeled as other labeled instances within the group.

In some embodiments, any suitable portion of the training data 608 may be utilized during the training phase 604 to train the model(s) 602. For example, 70% of labeled data 606 and/or unlabeled data 610 may be utilized to train the model(s) 602. Once trained, or at any suitable time, the model(s) 602 may be evaluated to assess their quality (e.g., the accuracy of output(s) 612 with respect to the labels corresponding to labeled data 606). By way of example, a portion of the examples of labeled data 606 and/or unlabeled data 610 may be utilized as input to the model(s) 602 in order to generate output(s) 612. By way of an example, an example of the labeled data 606 may be provided as input, and the corresponding output (e.g., output(s) 612) may be compared to the label already known to be associated with the example. If some portion of the output (e.g., a label) matches the example label, that portion of the output may be deemed accurate. Any suitable number of labeled examples may be utilized, and a number of accurate labels may be compared to the total number of examples provided (and/or the total number of labels previously identified) to determine an accuracy value for a given model that quantifies a degree of accuracy for the model. For example, if 90 out of 100 of the input examples generate output labels that match the previously known example labels, the model being assessed may be determined to be 90% accurate.

In some embodiments, as the model(s) 602 are utilized for subsequent inputs, the subsequent output generated by the model(s) 602 may be added to corresponding input and used to retrain and/or update the model(s) 602 at 616. In some embodiments, the example may not be used to retrain or update the model until feedback procedure 614 is executed. In feedback procedure 614 the example (e.g., an example including one or more historical consumption data instances corresponding to one or more devices and/or racks) and the corresponding output generated for the example by one of the model(s) 602 is presented to a user and the user identifies whether the output generated (e.g., amount and/or likelihood confidence value) is correct for the given example.

The training process depicted in FIG. 6 (e.g., method 600) may be performed any suitable number of times at any suitable interval and/or according to any suitable schedule such that the accuracy of the model(s) 602 are improved over time.

In some embodiments, any suitable number and/or combination of the model(s) 602 may be used to determine output. In some embodiments, the power management service 450 may utilize any suitable combination of output provided by the model(s) 602 to determine whether a budget threshold of a given component (e.g., a row-level PDU) is likely to be breached (and/or is likely to be breached by some amount). Thus, in some embodiment, models that have trained with any suitable combination of supervised and unsupervised learning algorithms may be utilized by the power management service 450.

Figure 7:
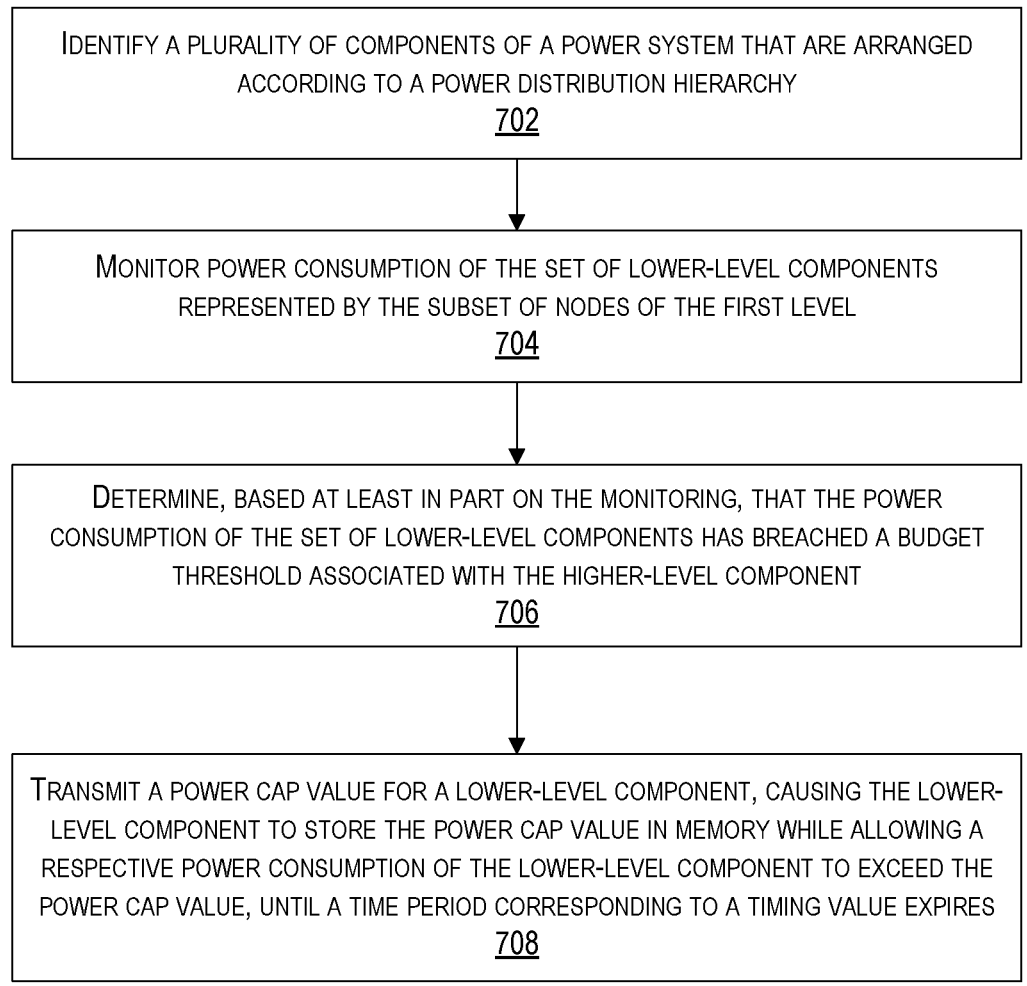
FIG. 7 is a block diagram illustrating an example method for managing power, in accordance with at least one embodiment.

FIG. 7 is a block diagram illustrating an example method for managing power, in accordance with at least one embodiment. Method 700 may be performed by one or more components of system 400 of FIG. 4. By way of example. The method 700 may be performed, at least in part, by the power management service 406 of FIG. 4. The operations of method 700 may be performed in any suitable order. More or few operations than those depicted in FIG. 7 may be included in method 700.

At 702, a plurality of components of a power system (e.g., system 400) may be identified. In some embodiments, the plurality of components are arranged according to a power distribution hierarchy (e.g., power distribution hierarchy 300 of FIG. 3) that comprises a plurality of nodes organized according to respective levels of a plurality of levels. In some embodiments, a node of the plurality of nodes of the power distribution hierarchy represents a corresponding component of the plurality of components. In some embodiments, a subset of nodes (e.g., nodes 314 and 316 of FIG. 3) of a first level of the plurality of levels (e.g., level 1) may descend from a particular node (e.g., node 306 of FIG. 3 corresponding to a power distribution unit) of a second level (e.g., a row level) of the plurality of levels that is higher than the first level. In some embodiments, a set of lower-level components of the plurality of components that are represented by the subset of nodes of the first level receive power distributed through a higher-level component of the plurality of components that is represented by the particular node of the second level.

At 704, power consumption of the set of lower-level components represented by the subset of nodes of the first level may be monitored. In some embodiments, monitoring the power consumption may include receiving device and/or rack consumption data as described above in connection with method 500 of FIG. 5.

At 706, it may be determined, based at least in part on the monitoring, that the power consumption of the set of lower-level components has breached a budget threshold associated with the higher-level component. In some embodiments, the budget threshold may be considered breached when the power consumption of the set of lower-level components exceeds a budgeted power amount allocated to the higher-level component. In some embodiments, the budget threshold may be considered breached when the power consumption of the set of lower-level components approaches (e.g., within a threshold) a budgeted power amount allocated to the higher-level component. In some embodiments, determining that the budget threshold has been breached may utilize historical consumption data in the manner described above in connection with 516 of FIG. 5.

At 708, responsive to determining that the power consumption of the set of lower-level components has breached the budget threshold associated with the higher-level component, a power cap value for a lower-level component may be transmitted. The transmission of the power cap value may cause the lower-level component to store the power cap value in memory while allowing a respective power consumption of the lower-level component to exceed the power cap value, until a time period corresponding to a timing value expires.

Figure 8:
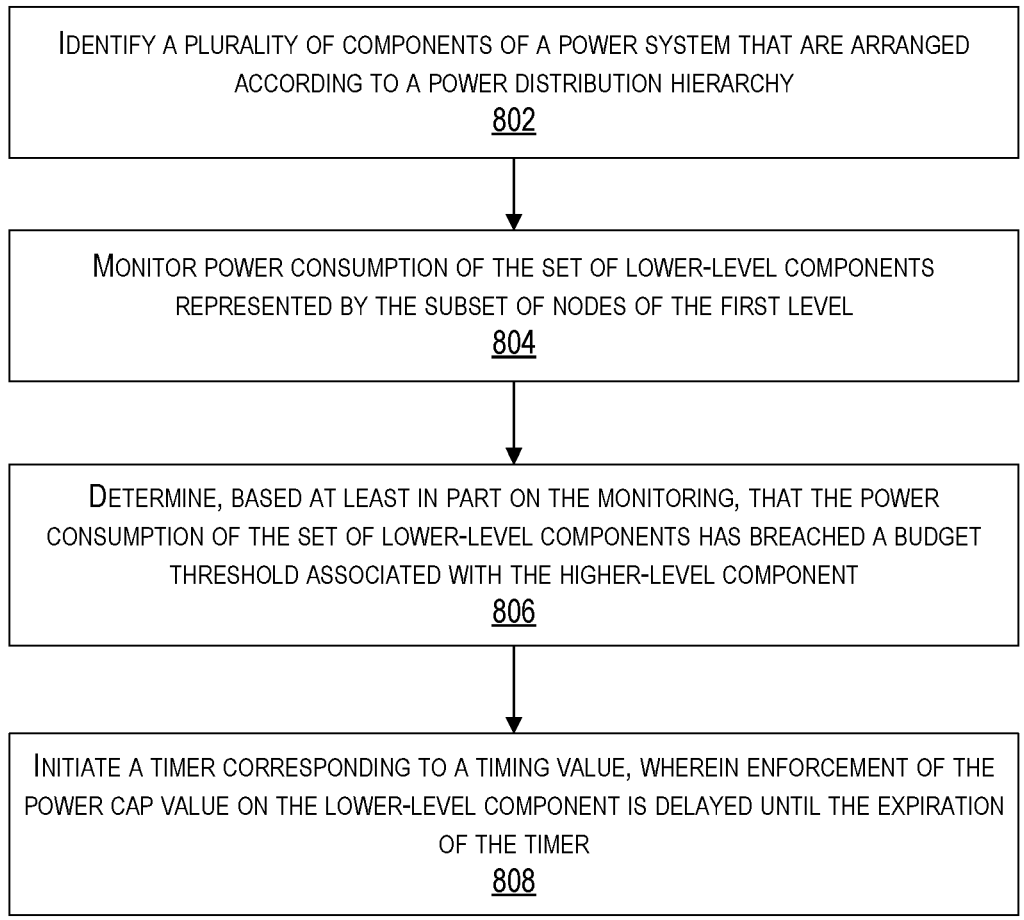
FIG. 8 is a block diagram illustrating another example method for managing power, in accordance with at least one embodiment.

FIG. 8 is a block diagram illustrating another example method 800 for managing power, in accordance with at least one embodiment. Method 800 may be performed by one or more components of system 400 of FIG. 4. By way of example. The method 800 may be performed, at least in part, by the power management service 406 of FIG. 4. The operations of method 800 may be performed in any suitable order. More or few operations than those depicted in FIG. 8 may be included in method 800.

At 802, a plurality of components of a power system (e.g., system 400) may be identified. In some embodiments, the plurality of components are arranged according to a power distribution hierarchy (e.g., power distribution hierarchy 300 of FIG. 3) that comprises a plurality of nodes organized according to respective levels of a plurality of levels. In some embodiments, a node of the plurality of nodes of the power distribution hierarchy represents a corresponding component of the plurality of components. In some embodiments, a subset of nodes (e.g., nodes 314 and 316 of FIG. 3) of a first level of the plurality of levels (e.g., level 1) may descend from a particular node (e.g., node 306 of FIG. 3 corresponding to a power distribution unit) of a second level (e.g., a row level) of the plurality of levels that is higher than the first level. In some embodiments, a set of lower-level components of the plurality of components that are represented by the subset of nodes of the first level receive power distributed through a higher-level component of the plurality of components that is represented by the particular node of the second level.

At 804, power consumption of the set of lower-level components represented by the subset of nodes of the first level may be monitored. In some embodiments, monitoring the power consumption may include receiving device and/or rack consumption data as described above in connection with method 500 of FIG. 5.

At 806, it may be determined, based at least in part on the monitoring, that the power consumption of the set of lower-level components has breached a budget threshold associated with the higher-level component. In some embodiments, the budget threshold may be considered breached when the power consumption of the set of lower-level components exceeds a budgeted power amount allocated to the higher-level component. In some embodiments, the budget threshold may be considered breached when the power consumption of the set of lower-level components approaches (e.g., within a threshold) a budgeted power amount allocated to the higher-level component. In some embodiments, determining that the budget threshold has been breached may utilize historical consumption data in the manner described above in connection with 516 of FIG. 5.

At 808, responsive to determining that the power consumption of the set of lower-level components has breached the budget threshold associated with the higher-level component, a timer corresponding to a timing value may be initiated. In some embodiments, expiration of the timer indicates expiration of a time period corresponding to the timing value. A lower-level component of the lower-level components (e.g., servers corresponding to device(s) 404 of FIG. 4 may store a power cap value in memory during the time period. In some embodiments, enforcement of the power cap value on the lower-level component is delayed until expiration of the timer.

FIGS. 9-13 depict a number of example environments which may be hosted by components of a datacenter (e.g., device(s) 404). The environments depicted in FIGS. 9-13 depict cloud-computing, multi-tenant environments. As described above, cloud-computing and/or multi-tenant environments, and other environments, may benefit from utilizing the power management techniques disclosed herein. These techniques enable a datacenter including components implementing the environments described in connection with FIGS. 9-13, among others, to more efficiently utilize the power resources of the datacenter over conventional techniques that left large amounts of power unutilized.

Infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 9:
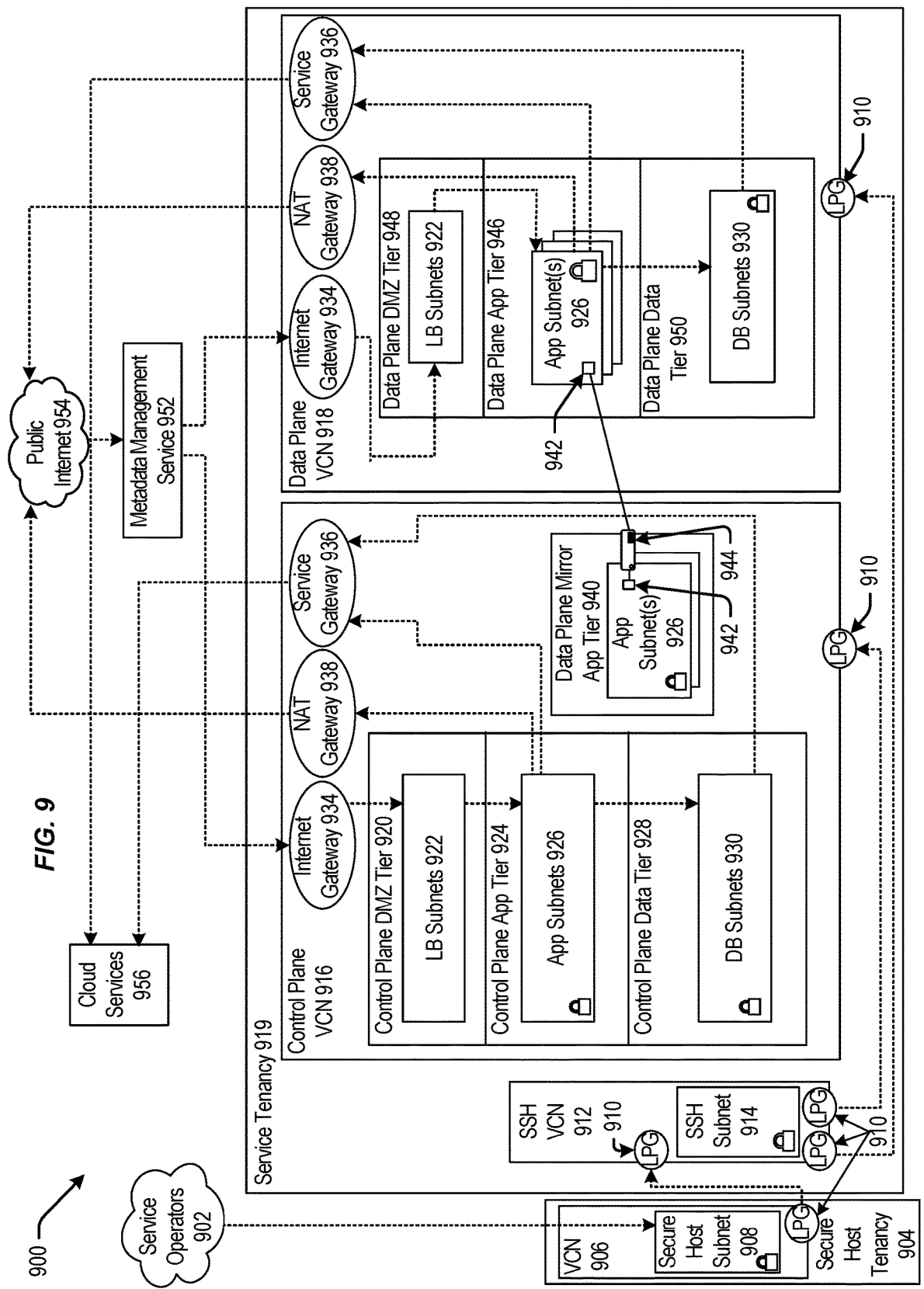
FIG. 9 is a block diagram illustrating one pattern for implementing a cloud infrastructure as a service system, according to at least one embodiment.

FIG. 9 is a block diagram 900 illustrating an example pattern of an IaaS architecture, according to at least one embodiment. Service operators 902 can be communicatively coupled to a secure host tenancy 904 that can include a virtual cloud network (VCN) 906 and a secure host subnet 908. In some examples, the service operators 902 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 906 and/or the Internet.

The VCN 906 can include a local peering gateway (LPG) 910 that can be communicatively coupled to a secure shell (SSH) VCN 912 via an LPG 910 contained in the SSH VCN 912. The SSH VCN 912 can include an SSH subnet 914, and the SSH VCN 912 can be communicatively coupled to a control plane VCN 916 via the LPG 910 contained in the control plane VCN 916. Also, the SSH VCN 912 can be communicatively coupled to a data plane VCN 918 via an LPG 910. The control plane VCN 916 and the data plane VCN 918 can be contained in a service tenancy 919 that can be owned and/or operated by the IaaS provider.

The control plane VCN 916 can include a control plane demilitarized zone (DMZ) tier 920 that acts as a perimeter network (e.g., portions of a corporate network between the corporate intranet and external networks). The DMZ-based servers may have restricted responsibilities and help keep breaches contained. Additionally, the DMZ tier 920 can include one or more load balancer (LB) subnet(s) 922, a control plane app tier 924 that can include app subnet(s) 926, a control plane data tier 928 that can include database (DB) subnet(s) 930 (e.g., frontend DB subnet(s) and/or backend DB subnet(s)). The LB subnet(s) 922 contained in the control plane DMZ tier 920 can be communicatively coupled to the app subnet(s) 926 contained in the control plane app tier 924 and an Internet gateway 934 that can be contained in the control plane VCN 916, and the app subnet(s) 926 can be communicatively coupled to the DB subnet(s) 930 contained in the control plane data tier 928 and a service gateway 936 and a network address translation (NAT) gateway 938. The control plane VCN 916 can include the service gateway 936 and the NAT gateway 938.

The control plane VCN 916 can include a data plane mirror app tier 940 that can include app subnet(s) 926. The app subnet(s) 926 contained in the data plane mirror app tier 940 can include a virtual network interface controller (VNIC) 942 that can execute a compute instance 944. The compute instance 944 can communicatively couple the app subnet(s) 926 of the data plane mirror app tier 940 to app subnet(s) 926 that can be contained in a data plane app tier 946.

The data plane VCN 918 can include the data plane app tier 946, a data plane DMZ tier 948, and a data plane data tier 950. The data plane DMZ tier 948 can include LB subnet(s) 922 that can be communicatively coupled to the app subnet(s) 926 of the data plane app tier 946 and the Internet gateway 934 of the data plane VCN 918. The app subnet(s) 926 can be communicatively coupled to the service gateway 936 of the data plane VCN 918 and the NAT gateway 938 of the data plane VCN 918. The data plane data tier 950 can also include the DB subnet(s) 930 that can be communicatively coupled to the app subnet(s) 926 of the data plane app tier 946.

The Internet gateway 934 of the control plane VCN 916 and of the data plane VCN 918 can be communicatively coupled to a metadata management service 952 that can be communicatively coupled to public Internet 954. Public Internet 954 can be communicatively coupled to the NAT gateway 938 of the control plane VCN 916 and of the data plane VCN 918. The service gateway 936 of the control plane VCN 916 and of the data plane VCN 918 can be communicatively couple to cloud services 956.

In some examples, the service gateway 936 of the control plane VCN 916 or of the data plane VCN 918 can make application programming interface (API) calls to cloud services 956 without going through public Internet 954. The API calls to cloud services 956 from the service gateway 936 can be one-way: the service gateway 936 can make API calls to cloud services 956, and cloud services 956 can send requested data to the service gateway 936. But, cloud services 956 may not initiate API calls to the service gateway 936.

In some examples, the secure host tenancy 904 can be directly connected to the service tenancy 919, which may be otherwise isolated. The secure host subnet 908 can communicate with the SSH subnet 914 through an LPG 910 that may enable two-way communication over an otherwise isolated system. Connecting the secure host subnet 908 to the SSH subnet 914 may give the secure host subnet 908 access to other entities within the service tenancy 919.

The control plane VCN 916 may allow users of the service tenancy 919 to set up or otherwise provision desired resources. Desired resources provisioned in the control plane VCN 916 may be deployed or otherwise used in the data plane VCN 918. In some examples, the control plane VCN 916 can be isolated from the data plane VCN 918, and the data plane mirror app tier 940 of the control plane VCN 916 can communicate with the data plane app tier 946 of the data plane VCN 918 via VNICs 942 that can be contained in the data plane mirror app tier 940 and the data plane app tier 946.

In some examples, users of the system, or customers, can make requests, for example create, read, update, or delete (CRUD) operations, through public Internet 954 that can communicate the requests to the metadata management service 952. The metadata management service 952 can communicate the request to the control plane VCN 916 through the Internet gateway 934. The request can be received by the LB subnet(s) 922 contained in the control plane DMZ tier 920. The LB subnet(s) 922 may determine that the request is valid, and in response to this determination, the LB subnet(s) 922 can transmit the request to app subnet(s) 926 contained in the control plane app tier 924. If the request is validated and requires a call to public Internet 954, the call to public Internet 954 may be transmitted to the NAT gateway 938 that can make the call to public Internet 954. Metadata that may be desired to be stored by the request can be stored in the DB subnet(s) 930.

In some examples, the data plane mirror app tier 940 can facilitate direct communication between the control plane VCN 916 and the data plane VCN 918. For example, changes, updates, or other suitable modifications to configuration may be desired to be applied to the resources contained in the data plane VCN 918. Via a VNIC 942, the control plane VCN 916 can directly communicate with, and can thereby execute the changes, updates, or other suitable modifications to configuration to, resources contained in the data plane VCN 918.

In some embodiments, the control plane VCN 916 and the data plane VCN 918 can be contained in the service tenancy 919. In this case, the user, or the customer, of the system may not own or operate either the control plane VCN 916 or the data plane VCN 918. Instead, the IaaS provider may own or operate the control plane VCN 916 and the data plane VCN 918, both of which may be contained in the service tenancy 919. This embodiment can enable isolation of networks that may prevent users or customers from interacting with other users', or other customers', resources. Also, this embodiment may allow users or customers of the system to store databases privately without needing to rely on public Internet 954, which may not have a desired level of threat prevention, for storage.

In other embodiments, the LB subnet(s) 922 contained in the control plane VCN 916 can be configured to receive a signal from the service gateway 936. In this embodiment, the control plane VCN 916 and the data plane VCN 918 may be configured to be called by a customer of the IaaS provider without calling public Internet 954. Customers of the IaaS provider may desire this embodiment since database(s) that the customers use may be controlled by the IaaS provider and may be stored on the service tenancy 919, which may be isolated from public Internet 954.

Figure 10:
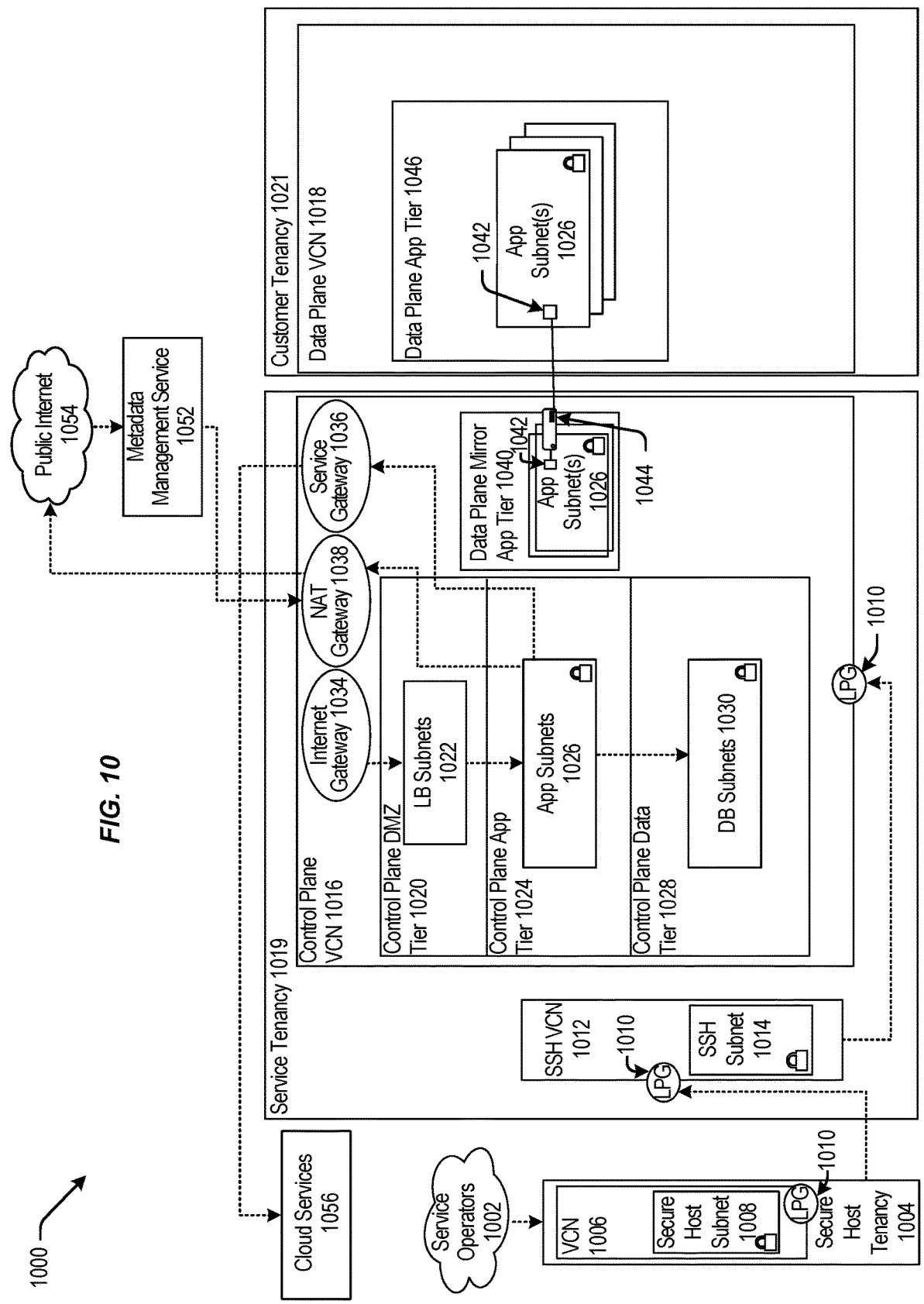
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 902 of FIG. 9) can be communicatively coupled to a secure host tenancy 1004 (e.g., the secure host tenancy 904 of FIG. 9) that can include a virtual cloud network (VCN) 1006 (e.g., the VCN 906 of FIG. 9) and a secure host subnet 1008 (e.g., the secure host subnet 908 of FIG. 9). The VCN 1006 can include a local peering gateway (LPG) 1010 (e.g., the LPG 910 of FIG. 9) that can be communicatively coupled to a secure shell (SSH) VCN 1012 (e.g., the SSH VCN 912 of FIG. 9) via an LPG 910 contained in the SSH VCN 1012. The SSH VCN 1012 can include an SSH subnet 1014 (e.g., the SSH subnet 914 of FIG. 9), and the SSH VCN 1012 can be communicatively coupled to a control plane VCN 1016 (e.g., the control plane VCN 916 of FIG. 9) via an LPG 1010 contained in the control plane VCN 1016. The control plane VCN 1016 can be contained in a service tenancy 1019 (e.g., the service tenancy 919 of FIG. 9), and the data plane VCN 1018 (e.g., the data plane VCN 918 of FIG. 9) can be contained in a customer tenancy 1021 that may be owned or operated by users, or customers, of the system.

The control plane VCN 1016 can include a control plane DMZ tier 1020 (e.g., the control plane DMZ tier 920 of FIG. 9) that can include LB subnet(s) 1022 (e.g., LB subnet(s) 922 of FIG. 9), a control plane app tier 1024 (e.g., the control plane app tier 924 of FIG. 9) that can include app subnet(s) 1026 (e.g., app subnet(s) 926 of FIG. 9), a control plane data tier 1028 (e.g., the control plane data tier 928 of FIG. 9) that can include database (DB) subnet(s) 1030 (e.g., similar to DB subnet(s) 930 of FIG. 9). The LB subnet(s) 1022 contained in the control plane DMZ tier 1020 can be communicatively coupled to the app subnet(s) 1026 contained in the control plane app tier 1024 and an Internet gateway 1034 (e.g., the Internet gateway 934 of FIG. 9) that can be contained in the control plane VCN 1016, and the app subnet(s) 1026 can be communicatively coupled to the DB subnet(s) 1030 contained in the control plane data tier 1028 and a service gateway 1036 (e.g., the service gateway 936 of FIG. 9) and a network address translation (NAT) gateway 1038 (e.g., the NAT gateway 938 of FIG. 9). The control plane VCN 1016 can include the service gateway 1036 and the NAT gateway 1038.

The control plane VCN 1016 can include a data plane mirror app tier 1040 (e.g., the data plane mirror app tier 940 of FIG. 9) that can include app subnet(s) 1026. The app subnet(s) 1026 contained in the data plane mirror app tier 1040 can include a virtual network interface controller (VNIC) 1042 (e.g., the VNIC of 942) that can execute a compute instance 1044 (e.g., similar to the compute instance 944 of FIG. 9). The compute instance 1044 can facilitate communication between the app subnet(s) 1026 of the data plane mirror app tier 1040 and the app subnet(s) 1026 that can be contained in a data plane app tier 1046 (e.g., the data plane app tier 946 of FIG. 9) via the VNIC 1042 contained in the data plane mirror app tier 1040 and the VNIC 1042 contained in the data plane app tier 1046.

The Internet gateway 1034 contained in the control plane VCN 1016 can be communicatively coupled to a metadata management service 1052 (e.g., the metadata management service 952 of FIG. 9) that can be communicatively coupled to public Internet 1054 (e.g., public Internet 954 of FIG. 9). Public Internet 1054 can be communicatively coupled to the NAT gateway 1038 contained in the control plane VCN 1016. The service gateway 1036 contained in the control plane VCN 1016 can be communicatively couple to cloud services 1056 (e.g., cloud services 956 of FIG. 9).

In some examples, the data plane VCN 1018 can be contained in the customer tenancy 1021. In this case, the IaaS provider may provide the control plane VCN 1016 for each customer, and the IaaS provider may, for each customer, set up a unique compute instance 1044 that is contained in the service tenancy 1019. Each compute instance 1044 may allow communication between the control plane VCN 1016, contained in the service tenancy 1019, and the data plane VCN 1018 that is contained in the customer tenancy 1021. The compute instance 1044 may allow resources, that are provisioned in the control plane VCN 1016 that is contained in the service tenancy 1019, to be deployed or otherwise used in the data plane VCN 1018 that is contained in the customer tenancy 1021.

In other examples, the customer of the IaaS provider may have databases that live in the customer tenancy 1021. In this example, the control plane VCN 1016 can include the data plane mirror app tier 1040 that can include app subnet(s) 1026. The data plane mirror app tier 1040 can reside in the data plane VCN 1018, but the data plane mirror app tier 1040 may not live in the data plane VCN 1018. That is, the data plane mirror app tier 1040 may have access to the customer tenancy 1021, but the data plane mirror app tier 1040 may not exist in the data plane VCN 1018 or be owned or operated by the customer of the IaaS provider. The data plane mirror app tier 1040 may be configured to make calls to the data plane VCN 1018 but may not be configured to make calls to any entity contained in the control plane VCN 1016. The customer may desire to deploy or otherwise use resources in the data plane VCN 1018 that are provisioned in the control plane VCN 1016, and the data plane mirror app tier 1040 can facilitate the desired deployment, or other usage of resources, of the customer.

In some embodiments, the customer of the IaaS provider can apply filters to the data plane VCN 1018. In this embodiment, the customer can determine what the data plane VCN 1018 can access, and the customer may restrict access to public Internet 1054 from the data plane VCN 1018. The IaaS provider may not be able to apply filters or otherwise control access of the data plane VCN 1018 to any outside networks or databases. Applying filters and controls by the customer onto the data plane VCN 1018, contained in the customer tenancy 1021, can help isolate the data plane VCN 1018 from other customers and from public Internet 1054.

In some embodiments, cloud services 1056 can be called by the service gateway 1036 to access services that may not exist on public Internet 1054, on the control plane VCN 1016, or on the data plane VCN 1018. The connection between cloud services 1056 and the control plane VCN 1016 or the data plane VCN 1018 may not be live or continuous. Cloud services 1056 may exist on a different network owned or operated by the IaaS provider. Cloud services 1056 may be configured to receive calls from the service gateway 1036 and may be configured to not receive calls from public Internet 1054. Some cloud services 1056 may be isolated from other cloud services 1056, and the control plane VCN 1016 may be isolated from cloud services 1056 that may not be in the same region as the control plane VCN 1016. For example, the control plane VCN 1016 may be located in "Region 1," and cloud service "Deployment 9," may be located in Region 1 and in "Region 2." If a call to Deployment 9 is made by the service gateway 1036 contained in the control plane VCN 1016 located in Region 1, the call may be transmitted to Deployment 9 in Region 1. In this example, the control plane VCN 1016, or Deployment 9 in Region 1, may not be communicatively coupled to, or otherwise in communication with, Deployment 9 in Region 2.

Figure 11:
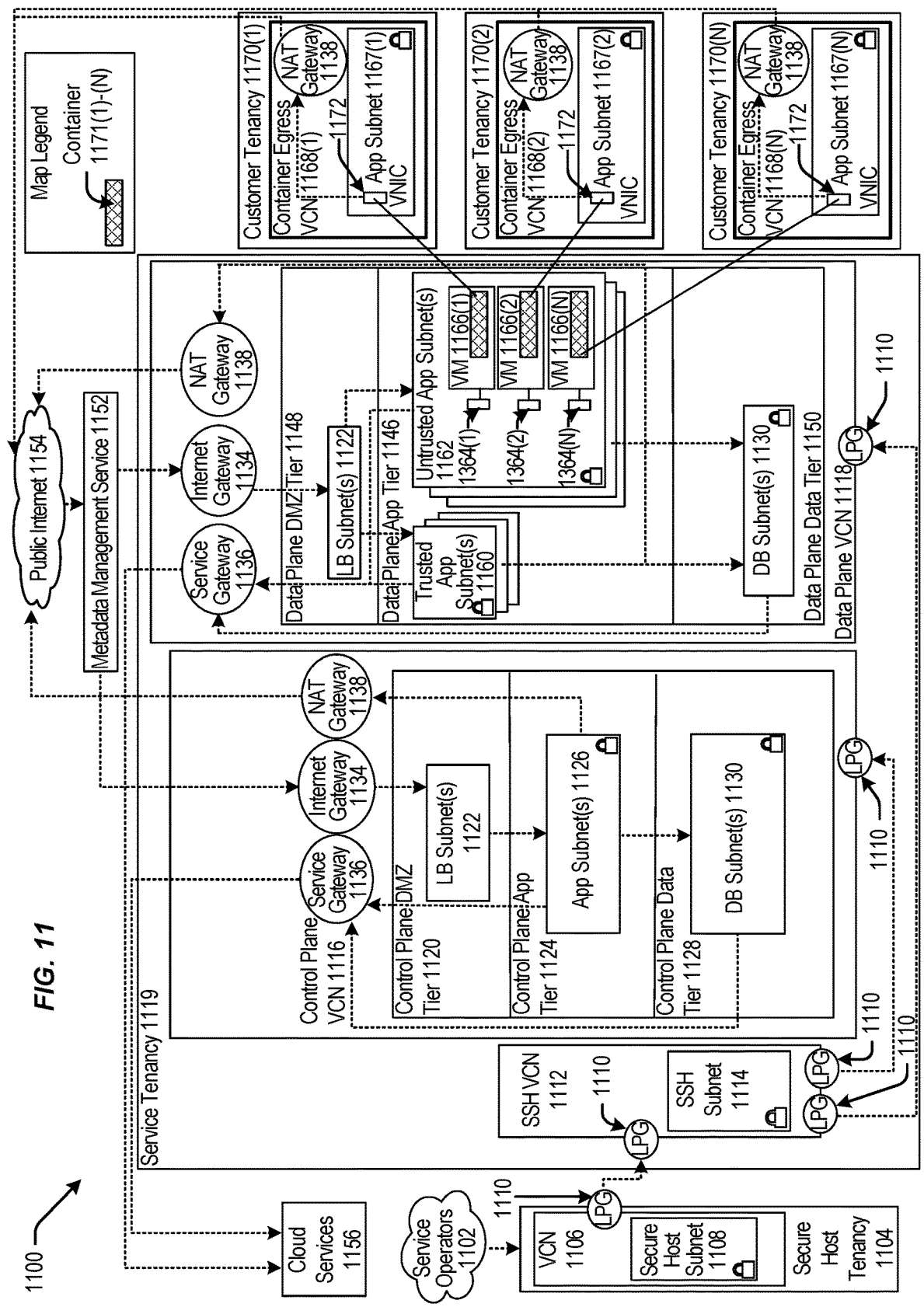
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 902 of FIG. 9) can be communicatively coupled to a secure host tenancy 1104 (e.g., the secure host tenancy 904 of FIG. 9) that can include a virtual cloud network (VCN) 1106 (e.g., the VCN 906 of FIG. 9) and a secure host subnet 1108 (e.g., the secure host subnet 908 of FIG. 9). The VCN 1106 can include an LPG 1110 (e.g., the LPG 910 of FIG. 9) that can be communicatively coupled to an SSH VCN 1112 (e.g., the SSH VCN 912 of FIG. 9) via an LPG 1110 contained in the SSH VCN 1112. The SSH VCN 1112 can include an SSH subnet 1114 (e.g., the SSH subnet 914 of FIG. 9), and the SSH VCN 1112 can be communicatively coupled to a control plane VCN 1116 (e.g., the control plane VCN 916 of FIG. 9) via an LPG 1110 contained in the control plane VCN 1116 and to a data plane VCN 1118 (e.g., the data plane 918 of FIG. 9) via an LPG 1110 contained in the data plane VCN 1118. The control plane VCN 1116 and the data plane VCN 1118 can be contained in a service tenancy 1119 (e.g., the service tenancy 919 of FIG. 9).

The control plane VCN 1116 can include a control plane DMZ tier 1120 (e.g., the control plane DMZ tier 920 of FIG. 9) that can include load balancer (LB) subnet(s) 1122 (e.g., LB subnet(s) 922 of FIG. 9), a control plane app tier 1124 (e.g., the control plane app tier 924 of FIG. 9) that can include app subnet(s) 1126 (e.g., similar to app subnet(s) 926 of FIG. 9), a control plane data tier 1128 (e.g., the control plane data tier 928 of FIG. 9) that can include DB subnet(s) 1130. The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 934 of FIG. 9) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 9) and a network address translation (NAT) gateway 1138 (e.g., the NAT gateway 938 of FIG. 9). The control plane VCN 1116 can include the service gateway 1136 and the NAT gateway 1138.

The data plane VCN 1118 can include a data plane app tier 1146 (e.g., the data plane app tier 946 of FIG. 9), a data plane DMZ tier 1148 (e.g., the data plane DMZ tier 948 of FIG. 9), and a data plane data tier 1150 (e.g., the data plane data tier 950 of FIG. 9). The data plane DMZ tier 1148 can include LB subnet(s) 1122 that can be communicatively coupled to trusted app subnet(s) 1160 and untrusted app subnet(s) 1162 of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include one or more primary VNICs 1164(1)-(N) that can be communicatively coupled to tenant virtual machines (VMs) 1166(1)-(N). Each tenant VM 1166(1)-(N) can be communicatively coupled to a respective app subnet 1167(1)-(N) that can be contained in respective container egress VCNs 1168(1)-(N) that can be contained in respective customer tenancies 1170(1)-(N). Respective secondary VNICs 1172(1)-(N) can facilitate communication between the untrusted app subnet(s) 1162 contained in the data plane VCN 1118 and the app subnet contained in the container egress VCNs 1168(1)-(N). Each container egress VCNs 1168(1)-(N) can include a NAT gateway 1138 that can be communicatively coupled to public Internet 1154 (e.g., public Internet 954 of FIG. 9).

The Internet gateway 1134 contained in the control plane VCN 1116 and contained in the data plane VCN 1118 can be communicatively coupled to a metadata management service 1152 (e.g., the metadata management system 952 of FIG. 9) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some embodiments, the data plane VCN 1118 can be integrated with customer tenancies 1170. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1146. Code to run the function may be executed in the VMs 1166(1)-(N), and the code may not be configured to run anywhere else on the data plane VCN 1118. Each VM 1166(1)-(N) may be connected to one customer tenancy 1170. Respective containers 1171(1)-(N) contained in the VMs 1166(1)-(N) may be configured to run the code. In this case, there can be a dual isolation (e.g., the containers 1171(1)-(N) running code, where the containers 1171(1)-(N) may be contained in at least the VM 1166(1)-(N) that are contained in the untrusted app subnet(s) 1162), which may help prevent incorrect or otherwise undesirable code from damaging the network of the IaaS provider or from damaging a network of a different customer. The containers 1171 (1)-(N) may be communicatively coupled to the customer tenancy 1170 and may be configured to transmit or receive data from the customer tenancy 1170. The containers 1171 (1)-(N) may not be configured to transmit or receive data from any other entity in the data plane VCN 1118. Upon completion of running the code, the IaaS provider may kill or otherwise dispose of the containers 1171(1)-(N).

In some embodiments, the trusted app subnet(s) 1160 may run code that may be owned or operated by the IaaS provider. In this embodiment, the trusted app subnet(s) 1160 may be communicatively coupled to the DB subnet(s) 1130 and be configured to execute CRUD operations in the DB subnet(s) 1130. The untrusted app subnet(s) 1162 may be communicatively coupled to the DB subnet(s) 1130, but in this embodiment, the untrusted app subnet(s) may be configured to execute read operations in the DB subnet(s) 1130. The containers 1171(1)-(N) that can be contained in the VM 1166(1)-(N) of each customer and that may run code from the customer may not be communicatively coupled with the DB subnet(s) 1130.

In other embodiments, the control plane VCN 1116 and the data plane VCN 1118 may not be directly communicatively coupled. In this embodiment, there may be no direct communication between the control plane VCN 1116 and the data plane VCN 1118. However, communication can occur indirectly through at least one method. An LPG 1110 may be established by the IaaS provider that can facilitate communication between the control plane VCN 1116 and the data plane VCN 1118. In another example, the control plane VCN 1116 or the data plane VCN 1118 can make a call to cloud services 1156 via the service gateway 1136. For example, a call to cloud services 1156 from the control plane VCN 1116 can include a request for a service that can communicate with the data plane VCN 1118.

Figure 12:
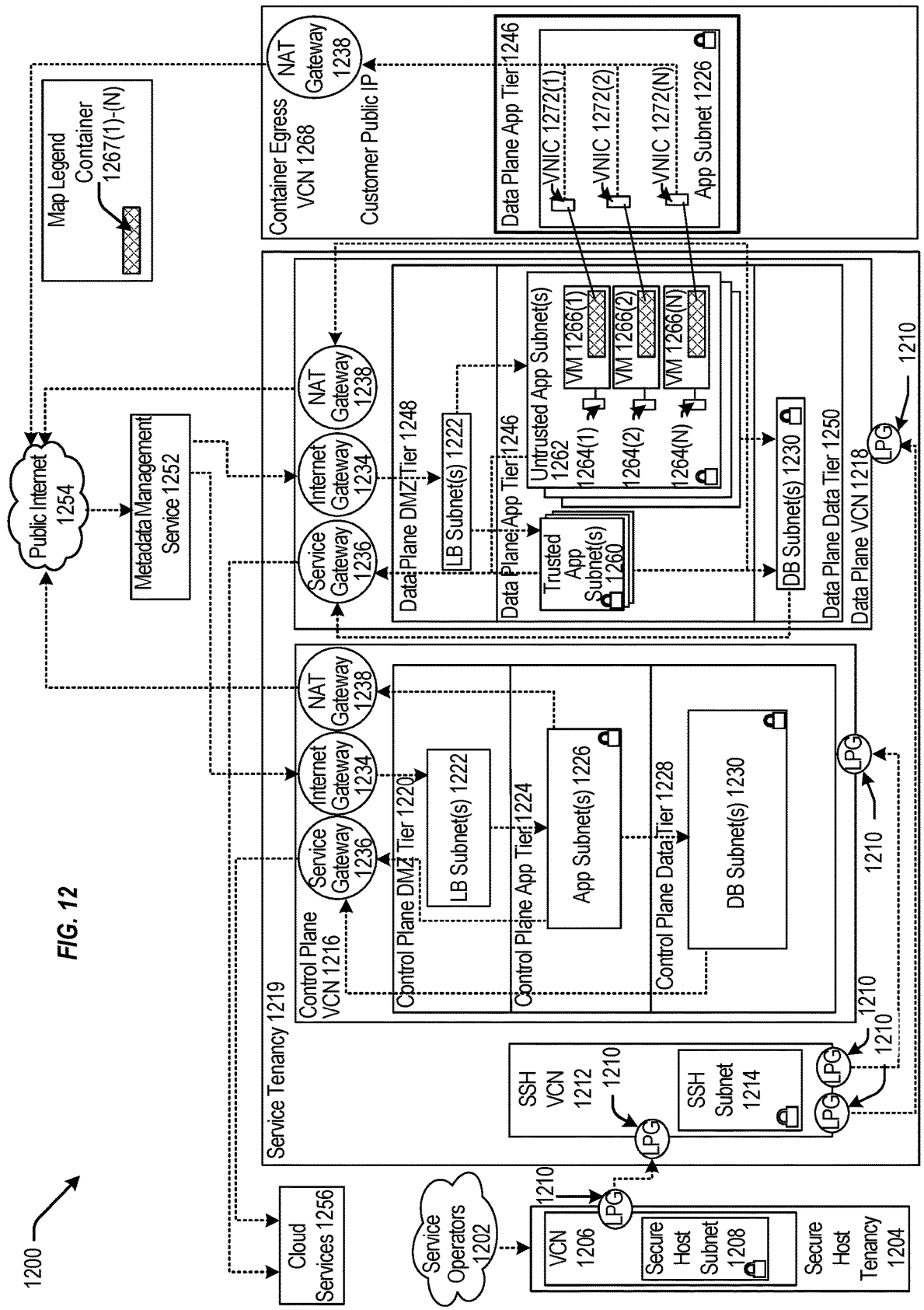
FIG. 12 is a block diagram illustrating another pattern for implementing a cloud infrastructure as a service system, according to at least one embodiment.

FIG. 12 is a block diagram 1200 illustrating another example pattern of an IaaS architecture, according to at least one embodiment. Service operators 1202 (e.g., service operators 902 of FIG. 9) can be communicatively coupled to a secure host tenancy 1204 (e.g., the secure host tenancy 904 of FIG. 9) that can include a virtual cloud network (VCN) 1206 (e.g., the VCN 906 of FIG. 9) and a secure host subnet 1208 (e.g., the secure host subnet 908 of FIG. 9). The VCN 1206 can include an LPG 1210 (e.g., the LPG 910 of FIG. 9) that can be communicatively coupled to an SSH VCN 1212 (e.g., the SSH VCN 912 of FIG. 9) via an LPG 1210 contained in the SSH VCN 1212. The SSH VCN 1212 can include an SSH subnet 1214 (e.g., the SSH subnet 914 of FIG. 9), and the SSH VCN 1212 can be communicatively coupled to a control plane VCN 1216 (e.g., the control plane VCN 916 of FIG. 9) via an LPG 1210 contained in the control plane VCN 1216 and to a data plane VCN 1218 (e.g., the data plane 918 of FIG. 9) via an LPG 1210 contained in the data plane VCN 1218. The control plane VCN 1216 and the data plane VCN 1218 can be contained in a service tenancy 1219 (e.g., the service tenancy 919 of FIG. 9).

The control plane VCN 1216 can include a control plane DMZ tier 1220 (e.g., the control plane DMZ tier 920 of FIG. 9) that can include LB subnet(s) 1222 (e.g., LB subnet(s) 922 of FIG. 9), a control plane app tier 1224 (e.g., the control plane app tier 924 of FIG. 9) that can include app subnet(s) 1226 (e.g., app subnet(s) 926 of FIG. 9), a control plane data tier 1228 (e.g., the control plane data tier 928 of FIG. 9) that can include DB subnet(s) 1230 (e.g., DB subnet(s) 1130 of FIG. 11). The LB subnet(s) 1222 contained in the control plane DMZ tier 1220 can be communicatively coupled to the app subnet(s) 1226 contained in the control plane app tier 1224 and to an Internet gateway 1234 (e.g., the Internet gateway 934 of FIG. 9) that can be contained in the control plane VCN 1216, and the app subnet(s) 1226 can be communicatively coupled to the DB subnet(s) 1230 contained in the control plane data tier 1228 and to a service gateway 1236 (e.g., the service gateway of FIG. 9) and a network address translation (NAT) gateway 1238 (e.g., the NAT gateway 938 of FIG. 9). The control plane VCN 1216 can include the service gateway 1236 and the NAT gateway 1238.

The data plane VCN 1218 can include a data plane app tier 1246 (e.g., the data plane app tier 946 of FIG. 9), a data plane DMZ tier 1248 (e.g., the data plane DMZ tier 948 of FIG. 9), and a data plane data tier 1250 (e.g., the data plane data tier 950 of FIG. 9). The data plane DMZ tier 1248 can include LB subnet(s) 1222 that can be communicatively coupled to trusted app subnet(s) 1260 (e.g., trusted app subnet(s) 1160 of FIG. 11) and untrusted app subnet(s) 1262 (e.g., untrusted app subnet(s) 1162 of FIG. 11) of the data plane app tier 1246 and the Internet gateway 1234 contained in the data plane VCN 1218. The trusted app subnet(s) 1260 can be communicatively coupled to the service gateway 1236 contained in the data plane VCN 1218, the NAT gateway 1238 contained in the data plane VCN 1218, and DB subnet(s) 1230 contained in the data plane data tier 1250. The untrusted app subnet(s) 1262 can be communicatively coupled to the service gateway 1236 contained in the data plane VCN 1218 and DB subnet(s) 1230 contained in the data plane data tier 1250. The data plane data tier 1250 can include DB subnet(s) 1230 that can be communicatively coupled to the service gateway 1236 contained in the data plane VCN 1218.

The untrusted app subnet(s) 1262 can include primary VNICs 1264(1)-(N) that can be communicatively coupled to tenant virtual machines (VMs) 1266(1)-(N) residing within the untrusted app subnet(s) 1262. Each tenant VM 1266(1)-(N) can run code in a respective container 1267(1)-(N) and be communicatively coupled to an app subnet 1226 that can be contained in a data plane app tier 1246 that can be contained in a container egress VCN 1268. Respective secondary VNICs 1272(1)-(N) can facilitate communication between the untrusted app subnet(s) 1262 contained in the data plane VCN 1218 and the app subnet contained in the container egress VCN 1268. The container egress VCN can include a NAT gateway 1238 that can be communicatively coupled to public Internet 1254 (e.g., public Internet 954 of FIG. 9).

The Internet gateway 1234 contained in the control plane VCN 1216 and contained in the data plane VCN 1218 can be communicatively coupled to a metadata management service 1252 (e.g., the metadata management system 952 of FIG. 9) that can be communicatively coupled to public Internet 1254. Public Internet 1254 can be communicatively coupled to the NAT gateway 1238 contained in the control plane VCN 1216 and contained in the data plane VCN 1218. The service gateway 1236 contained in the control plane VCN 1216 and contained in the data plane VCN 1218 can be communicatively couple to cloud services 1256.

In some examples, the pattern illustrated by the architecture of block diagram 1200 of FIG. 12 may be considered an exception to the pattern illustrated by the architecture of block diagram 1100 of FIG. 11 and may be desirable for a customer of the IaaS provider if the IaaS provider cannot directly communicate with the customer (e.g., a disconnected region). The respective containers 1267(1)-(N) that are contained in the VMs 1266(1)-(N) for each customer can be accessed in real-time by the customer. The containers 1267(1)-(N) may be configured to make calls to respective secondary VNICs 1272(1)-(N) contained in app subnet(s) 1226 of the data plane app tier 1246 that can be contained in the container egress VCN 1268. The secondary VNICs 1272(1)-(N) can transmit the calls to the NAT gateway 1238 that may transmit the calls to public Internet 1254. In this example, the containers 1267(1)-(N) that can be accessed in real-time by the customer can be isolated from the control plane VCN 1216 and can be isolated from other entities contained in the data plane VCN 1218. The containers 1267(1)-(N) may also be isolated from resources from other customers.

In other examples, the customer can use the containers 1267(1)-(N) to call cloud services 1256. In this example, the customer may run code in the containers 1267(1)-(N) that requests a service from cloud services 1256. The containers 1267(1)-(N) can transmit this request to the secondary VNICs 1272(1)-(N) that can transmit the request to the NAT gateway that can transmit the request to public Internet 1254. Public Internet 1254 can transmit the request to LB subnet(s) 1222 contained in the control plane VCN 1216 via the Internet gateway 1234. In response to determining the request is valid, the LB subnet(s) can transmit the request to app subnet(s) 1226 that can transmit the request to cloud services 1256 via the service gateway 1236.

It should be appreciated that IaaS architectures 900, 1000, 1100, 1200 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 13:
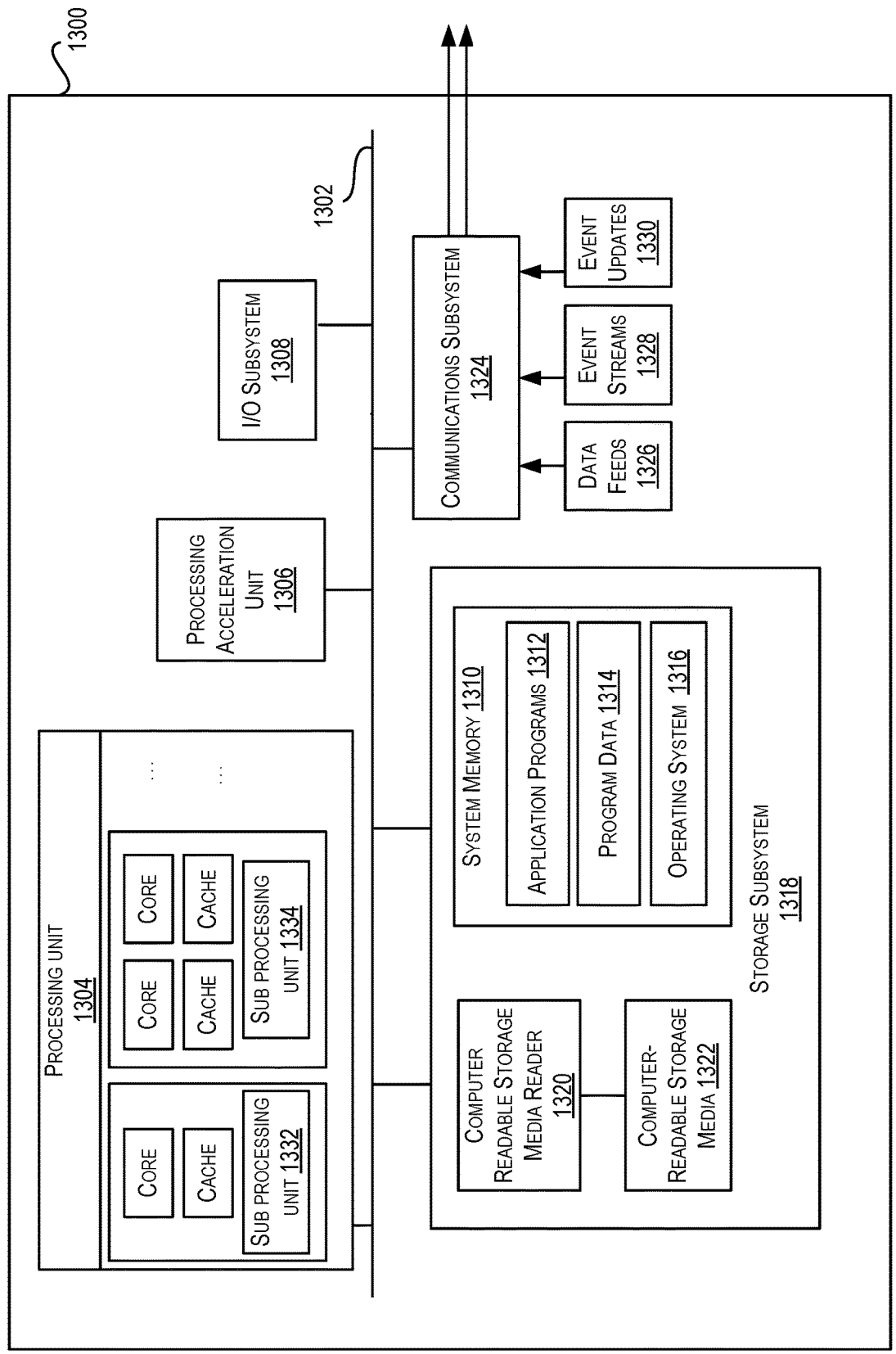
FIG. 13 is a block diagram illustrating an example computer system, according to at least one embodiment.

FIG. 13 illustrates an example computer system 1300, in which various embodiments may be implemented. The system 1300 may be used to implement any of the computer systems described above. As shown in the figure, computer system 1300 includes a processing unit 1304 that communicates with a number of peripheral subsystems via a bus subsystem 1302. These peripheral subsystems may include a processing acceleration unit 1306, an I/O subsystem 1308, a storage subsystem 1318 and a communications subsystem 1324. Storage subsystem 1318 includes tangible computer-readable storage media 1322 and a system memory 1310.

Bus subsystem 1302 provides a mechanism for letting the various components and subsystems of computer system 1300 communicate with each other as intended. Although bus subsystem 1302 is shown schematically as a single bus, alternative embodiments of the bus subsystem may utilize multiple buses. Bus subsystem 1302 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1304, which can be implemented as one or more integrated circuits (e.g., a conventional microprocessor or microcontroller), controls the operation of computer system 1300. One or more processors may be included in processing unit 1304. These processors may include single core or multicore processors. In certain embodiments, processing unit 1304 may be implemented as one or more independent processing units 1332 and/or 1334 with single or multicore processors included in each processing unit. In other embodiments, processing unit 1304 may also be implemented as a quad-core processing unit formed by integrating two dual-core processors into a single chip.

In various embodiments, processing unit 1304 can execute a variety of programs in response to program code and can maintain multiple concurrently executing programs or processes. At any given time, some or all of the program code to be executed can be resident in processor(s) 1304 and/or in storage subsystem 1318. Through suitable programming, processor(s) 1304 can provide various functionalities described above. Computer system 1300 may additionally include a processing acceleration unit 1306, which can include a digital signal processor (DSP), a special-purpose processor, and/or the like.

I/O subsystem 1308 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1300 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1300 may comprise a storage subsystem 1318 that provides a tangible non-transitory computer-readable storage medium for storing software and data constructs that provide the functionality of the embodiments described in this disclosure. The software can include programs, code modules, instructions, scripts, etc., that when executed by one or more cores or processors of processing unit 1304 provide the functionality described above. Storage subsystem 1318 may also provide a repository for storing data used in accordance with the present disclosure.

As depicted in the example in FIG. 13, storage subsystem 1318 can include various components including a system memory 1310, computer-readable storage media 1322, and a computer readable storage media reader 1320. System memory 1310 may store program instructions that are loadable and executable by processing unit 1304. System memory 1310 may also store data that is used during the execution of the instructions and/or data that is generated during the execution of the program instructions. Various different kinds of programs may be loaded into system memory 1310 including but not limited to client applications, Web browsers, mid-tier applications, relational database management systems (RDBMS), virtual machines, containers, etc.

System memory 1310 may also store an operating system 1316. Examples of operating system 1316 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems. In certain implementations where computer system 1300 executes one or more virtual machines, the virtual machines along with their guest operating systems (GOSs) may be loaded into system memory 1310 and executed by one or more processors or cores of processing unit 1304.

System memory 1310 can come in different configurations depending upon the type of computer system 1300. For example, system memory 1310 may be volatile memory (such as random-access memory (RAM)) and/or non-volatile memory (such as read-only memory (ROM), flash memory, etc.) Different types of RAM configurations may be provided including a static random-access memory (SRAM), a dynamic random-access memory (DRAM), and others. In some implementations, system memory 1310 may include a basic input/output system (BIOS) containing basic routines that help to transfer information between elements within computer system 1300, such as during start-up.

Computer-readable storage media 1322 may represent remote, local, fixed, and/or removable storage devices plus storage media for temporarily and/or more permanently containing, storing, computer-readable information for use by computer system 1300 including instructions executable by processing unit 1304 of computer system 1300.

Computer-readable storage media 1322 can include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media.

By way of example, computer-readable storage media 1322 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1322 may include, but is not limited to, Zip® drives, flash memory cards, universal serial bus (USB) flash drives, secure digital (SD) cards, DVD disks, digital video tape, and the like. Computer-readable storage media 1322 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1300.

Machine-readable instructions executable by one or more processors or cores of processing unit 1304 may be stored on a non-transitory computer-readable storage medium. A non-transitory computer-readable storage medium can include physically tangible memory or storage devices that include volatile memory storage devices and/or non-volatile storage devices. Examples of non-transitory computer-readable storage medium include magnetic storage media (e.g., disk or tapes), optical storage media (e.g., DVDs, CDs), various types of RAM, ROM, or flash memory, hard drives, floppy drives, detachable memory drives (e.g., USB drives), or other type of storage device.

Communications subsystem 1324 provides an interface to other computer systems and networks. Communications subsystem 1324 serves as an interface for receiving data from and transmitting data to other systems from computer system 1300. For example, communications subsystem 1324 may enable computer system 1300 to connect to one or more devices via the Internet. In some embodiments communications subsystem 1324 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1324 can provide wired network connectivity (e.g., Ethernet) in addition to or instead of a wireless interface.

In some embodiments, communications subsystem 1324 may also receive input communication in the form of structured and/or unstructured data feeds 1326, event streams 1328, event updates 1330, and the like on behalf of one or more users who may use computer system 1300.

By way of example, communications subsystem 1324 may be configured to receive data feeds 1326 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1324 may also be configured to receive data in the form of continuous data streams, which may include event streams 1328 of real-time events and/or event updates 1330, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1324 may also be configured to output the structured and/or unstructured data feeds 1326, event streams 1328, event updates 1330, and the like to one or more databases that may be in communication with one or more streaming data source computers coupled to computer system 1300.

Computer system 1300 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1300 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method, comprising:
   identifying, by a power management service, a plurality of components of a power system that are arranged according to a power distribution hierarchy that comprises a plurality of nodes organized according to respective levels of a plurality of levels, a node of the plurality of nodes of the power distribution hierarchy representing a corresponding component of the plurality of components, a subset of nodes of a first level of the plurality of levels descending from a particular node of a second level of the plurality of levels that is higher than the first level, and a set of lower-level components of the plurality of components that are represented by the subset of nodes of the first level receiving power distributed through a higher-level component of the plurality of components that is represented by the particular node of the second level;
   monitoring, by the power management service, power consumption of the set of lower-level components represented by the subset of nodes of the first level;
   determining, by the power management service based at least in part on the monitoring, that the power consumption of the set of lower-level components has breached a budget threshold associated with the higher-level component; and
   responsive to determining that the power consumption of the set of lower-level components has breached the budget threshold associated with the higher-level component, transmitting, by the power management service, a power cap value for a lower-level component and a timing value with which a timer is initiated, causing the lower-level component to store the power cap value in memory while allowing a respective power consumption of the lower-level component to exceed the power cap value, until the timer expires, indicating that a time period corresponding to the timing value has elapsed.

2. The method of claim 1, wherein storing the power cap value in memory while allowing the respective power consumption of the lower-level component to exceed the power cap value allows the set of lower-level components to continue to breach the budget threshold associated with the higher-level component for at least a portion of the time period corresponding to the timing value.

3. The method of claim 1,
   wherein the timing value is transmitted to an intermediate component represented by a specific node of an intermediate level of the power distribution hierarchy between the first level and the second level, wherein the set of lower-level components are configured to receive power distributed from the higher-level component through the intermediate component;
   wherein transmitting the timing value causes the intermediate component to generate the timer, the timer being configured to expire after the time period corresponding to the timing value has elapsed; and wherein the intermediate component is configured to instruct, based at least in part on expiration of the timer, the lower-level component to trigger operations for throttling its operations based at least in part on the power cap value.

4. The method of claim 1, wherein determining that the power consumption of the set of lower-level components has breached the budget threshold associated with the higher-level component further comprises determining that the power consumption of the set of lower-level components is likely to breach a budgeted amount of power allocated to the higher-level component.

5. The method of claim 4, further comprising:
obtaining, based at least in part on historical power consumption data associated with the set of lower-level components receiving power distributed by the higher-level component, a confidence value indicating that the power consumption corresponding to the set of lower-level components is likely to breach the budgeted amount of power allocated to the higher-level component; and
determining the confidence value exceeds a threshold.

6. A system, comprising:
memory configured to store instructions; and
one or more processors configured to execute the instructions to cause the system to at least:
identify, by a power management service, a plurality of components of a power system that are arranged according to a power distribution hierarchy that comprises a plurality of nodes organized according to respective levels of a plurality of levels, a node of the plurality of nodes of the power distribution hierarchy representing a corresponding component of the plurality of components, a subset of nodes of a first level of the plurality of levels descending from a particular node of a second level of the plurality of levels that is higher than the first level, and a set of lower-level components of the plurality of components that are represented by the subset of nodes of the first level receiving power distributed through a higher-level component of the plurality of components that is represented by the particular node of the second level;
monitor, by the power management service, power consumption of the set of lower-level components represented by the subset of nodes of the first level;
determine, by the power management service based at least in part on the monitoring, that the power consumption of the set of lower-level components has breached a budget threshold associated with the higher-level component; and
responsive to determining that the power consumption of the set of lower-level components has breached the budget threshold associated with the higher-level component, transmit, by the power management service, a power cap value for a lower-level component and a timing value with which a timer is initiated, causing the lower-level component to store the power cap value in memory while allowing a respective power consumption of the lower-level component to exceed the power cap value, until the timer expires, indicating that a time period corresponding to the timing value has elapsed.

7. The system of claim 6, wherein expiration of the timer corresponding to the time period triggers the lower-level component to limit power consumption based at least in part on at least one of: dynamic frequency scaling or dynamic voltage scaling.

8. The system of claim 6, wherein the second level of the power distribution hierarchy comprises two or more of the plurality of nodes representing at least the higher-level component corresponding to a first higher-level component and a second higher-level component different from the first higher-level component, wherein executing the instructions further causes the system to at least:
determine, by the power management service with respect to the second higher-level component, that there is an unutilized portion of power provisioned to the second higher-level component;
determine, by the power management service, a particular power cap value for a second lower-level component of a second set of lower-level components that are receiving power through the second higher-level component;
transmit, by the power management service, the respective power cap value for the second lower-level component, wherein transmitting the respective power cap value triggers the second lower-level component to throttle operations at the second lower-level component as part of enforcing the respective power cap value; and
transmit, by the power management service, a cancellation signal that causes the timer corresponding to the time period to be canceled, wherein canceling the timer causes the lower-level component to refrain from enforcing the power cap value after the time period elapses.

9. The system of claim 6, wherein executing the instructions further causes the system to at least, further responsive to determining that the power consumption of the set of lower-level components has breached the budget threshold associated with the higher-level component, determine, by the power management service, the power cap value based at least in part on at least one of: a difference between the power consumption of the set of lower-level components, a priority value associated with a workload being executed at the set of lower-level components, or individual consumption rates of the set of lower-level components.

10. The system of claim 6, wherein the power cap value is determined based on a monitored data value obtained at or after determining that the power consumption of the set of lower-level components has breached the budget threshold associated with the higher-level component.

11. A method, comprising:
identifying, by a power management service, a plurality of components of a power system that are arranged according to a power distribution hierarchy that comprises a plurality of nodes organized according to respective levels of a plurality of levels, a node of the plurality of nodes of the power distribution hierarchy representing a corresponding component of the plurality of components, a subset of nodes of a first level of the plurality of levels descending from a particular node of a second level of the plurality of levels that is higher than the first level, and a set of lower-level components of the plurality of components that are represented by the subset of nodes of the first level receiving power distributed through a higher-level component of the plurality of components that is represented by the particular node of the second level;
monitoring, by the power management service, power consumption of the set of lower-level components represented by the subset of nodes of the first level;

determining, by the power management service based at least in part on the monitoring, that the power consumption of the set of lower-level components has breached a budget threshold associated with the higher-level component;

responsive to determining that the power consumption of the set of lower-level components has breached the budget threshold associated with the higher-level component, initiating a timer corresponding to a timing value;

wherein expiration of the timer indicates expiration of a time period corresponding to the timing value;

wherein a lower-level component of the set of lower-level components stores a power cap value in memory during the time period;

wherein enforcement of the power cap value on the lower-level component is delayed until the expiration of the timer.

12. The method of claim 11, further comprising:
further responsive to determining that the power consumption of the set of lower-level components has breached the budget threshold associated with the higher-level component, determining, by the power management service, the timing value based at least in part on at least one of: a rate of change of the power consumption of the set of lower-level components, a direction of change corresponding to the rate of change of the power consumption of the set of lower-level components, a tolerance to power circuits associated with the higher-level component, or an expected time needed to initiate the power capping at each component in the set of lower-level components.

13. The method of claim 11, wherein initiating the timer corresponding to the timing value further comprises:
transmitting, by the power management service, the timing value to an intermediate component from which the lower-level component receives power, wherein transmitting the timing value causes the intermediate component to generate the timer corresponding to the timing value, the timer being configured to expire based on expiration of the time period corresponding to the timing value.

14. The method of claim 13, wherein the intermediate component triggers enforcement of the power cap value on the lower-level component upon expiration of the timer.

15. The method of claim 11, further comprising:
obtaining, based at least in part on historical power consumption data associated with a second set of lower-level components receiving power distributed by the higher-level component, a likelihood value indicating that a combined power consumption corresponding to the second set of lower-level components receiving power distributed by the higher-level component will likely exceed the budget threshold associated with the higher-level component; and
responsive to determining that the likelihood value exceeds a likelihood threshold, transmitting, by the power management service, an additional power cap value to a second lower-level component of the second set of lower-level components, wherein transmitting the additional power cap value causes the additional power cap value to be used to constrain corresponding power consumption at the second lower-level component of the second set of lower-level components.

16. A system, comprising:
memory configured to store instructions; and
one or more processors configured to execute the instructions to cause the system to at least:
identify, by a power management service, a plurality of components of a power system that are arranged according to a power distribution hierarchy that comprises a plurality of nodes organized according to respective levels of a plurality of levels, a node of the plurality of nodes of the power distribution hierarchy representing a corresponding component of the plurality of components, a subset of nodes of a first level of the plurality of levels descending from a particular node of a second level of the plurality of levels that is higher than the first level, and a set of lower-level components of the plurality of components that are represented by the subset of nodes of the first level receiving power distributed through a higher-level component of the plurality of components that is represented by the particular node of the second level;
monitor, by the power management service, power consumption of the set of lower-level components represented by the subset of nodes of the first level;
determine, by the power management service based at least in part on the monitoring, that the power consumption of the set of lower-level components has breached a budget threshold associated with the higher-level component;
responsive to determining that the power consumption of the set of lower-level components has breached the budget threshold associated with the higher-level component, initiate a timer corresponding to a timing value;
wherein expiration of the timer indicates expiration of a time period corresponding to the timing value;
wherein a lower-level component of the set of lower-level components stores a power cap value in memory during the time period;
wherein enforcement of the power cap value on the lower-level component is delayed until the expiration of the timer.

17. The system of claim 16, wherein executing the instructions further causes the system to at least, further responsive to determining that the power consumption of the set of lower-level components has breached the budget threshold associated with the higher-level component, determine, by the power management service, the timing value based at least in part on at least one of: a rate of change of the power consumption of the set of lower-level components, a direction of change corresponding to the rate of change of the power consumption of the set of lower-level components, a tolerance to power circuits associated with the higher-level component, or an expected time needed to initiate the power capping at each component in the set of lower-level components.

18. The system of claim 16, wherein the set of lower-level components is deemed to breach the budget threshold based at least in part on determining, by the power management service and based at least in part on historical consumption data associated with the set of lower-level components, that the power consumption of the set of lower-level components is likely to breach the budget threshold.

19. The system of claim 16, wherein the second level of the power distribution hierarchy comprises two or more of the plurality of nodes representing at least the higher-level component corresponding to a first higher-level component and a second higher-level component different from the first higher-level component, wherein executing the instructions further causes the system to at least:
- determine, by the power management service with respect to the second higher-level component, that there is an unutilized portion of power provisioned to the second higher-level component;
- determine, by the power management service, a particular power cap value for a second lower-level component of a second set of lower-level components that are receiving power through the second higher-level component;
- transmit, by the power management service, the particular power cap value for the second lower-level component, wherein transmitting the particular power cap value for the second lower-level component triggers power consumption restrictions to be performed at the second lower-level component as part of enforcing the particular power cap value; and
- transmit, by the power management service, a cancellation signal that causes the timer corresponding to the timing value to be canceled.

20. The system of claim 16, wherein the power cap value is determined based on a monitored data value obtained at or after determining that the power consumption of the set of lower-level components has breached the budget threshold associated with the higher-level component.

* * * * *